(12) United States Patent
Liberty et al.

(10) Patent No.: US 12,277,480 B1
(45) Date of Patent: Apr. 15, 2025

(54) IN-FLIGHT SCALING OF MACHINE LEARNING TRAINING JOBS

(71) Applicant: Amazon Technologies, Inc., Seattle, WA (US)

(72) Inventors: Edo Liberty, New York, NY (US); Thomas Albert Faulhaber, Jr., Seattle, WA (US); Zohar Karnin, Hoboken, NJ (US); Gowda Dayananda Anjaneyapura Range, Redmond, WA (US); Amir Sadoughi, New York, NY (US); Swaminathan Sivasubramanian, Sammamish, WA (US); Alexander Johannes Smola, Sunnyvale, CA (US); Stefano Stefani, Issaquah, WA (US); Craig Wiley, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 941 days.

(21) Appl. No.: 15/934,091

(22) Filed: Mar. 23, 2018

Related U.S. Application Data

(60) Provisional application No. 62/590,134, filed on Nov. 22, 2017.

(51) Int. Cl.
  *G06N 20/00* (2019.01)
  *G06F 9/48* (2006.01)

(52) U.S. Cl.
  CPC ........... *G06N 20/00* (2019.01); *G06F 9/4881* (2013.01)

(58) Field of Classification Search
  CPC ................................ G06N 20/00; G06F 9/4881
  See application file for complete search history.

(56) References Cited

U.S. PATENT DOCUMENTS

| | | |
|---|---|---|
| 6,263,308 B1 | 7/2001 | Heckerman et al. |
| 6,321,307 B1 | 11/2001 | Maguire et al. |
| 8,244,651 B1 | 8/2012 | Lin et al. |

(Continued)

FOREIGN PATENT DOCUMENTS

| | | |
|---|---|---|
| CN | 104246744 A | 12/2014 |
| CN | 105051693 A | 11/2015 |

(Continued)

OTHER PUBLICATIONS

Aurick Qiao, Abutalib Aghayev, Weiren Yu, Haoyang Chen, Qirong Ho, Garth A. Gibson, Eric P. Xing: Litz: Elastic Framework for High-Performance Distributed Machine Learning. Parallel Data Lab, Jun. 2017 (Year: 2017).*

(Continued)

*Primary Examiner* — Li B. Zhen
*Assistant Examiner* — Henry Nguyen
(74) *Attorney, Agent, or Firm* — Nicholson De Vos Webster & Elliott LLP

(57) ABSTRACT

Techniques for in-flight scaling of machine learning training jobs are described. A request to execute a machine learning (ML) training job is received within a provider network, and the ML training job is executed using a first one or more compute instances. Upon a determination that a performance characteristic of the ML training job satisfies a scaling condition, a second one or more compute instances are added to the ML training job while the first one or more compute instances continue to execute portions of the ML training job.

20 Claims, 13 Drawing Sheets

(56) References Cited

U.S. PATENT DOCUMENTS

| | | |
|---|---|---|
| 8,311,967 B1 | 11/2012 | Lin et al. |
| 8,996,372 B1 | 3/2015 | Secker-Walker et al. |
| 9,350,747 B2 | 5/2016 | Mclarnon et al. |
| 9,830,315 B1 | 11/2017 | Xiao et al. |
| 10,228,959 B1 | 3/2019 | Anderson et al. |
| 10,275,710 B1 | 4/2019 | Teredesai et al. |
| 10,303,388 B1 | 5/2019 | Lieberman et al. |
| 10,490,183 B2 | 11/2019 | Singh et al. |
| 10,534,965 B2 | 1/2020 | Singhal et al. |
| 10,621,019 B1 | 4/2020 | Faulhaber et al. |
| 10,810,491 B1 | 10/2020 | Xia et al. |
| 10,831,519 B2 | 11/2020 | Faulhaber et al. |
| 10,904,360 B1 | 1/2021 | Govan et al. |
| 11,257,002 B2 | 2/2022 | Faulhaber et al. |
| 11,537,439 B1 | 12/2022 | Liberty et al. |
| 11,550,614 B2 | 1/2023 | Faulhaber et al. |
| 11,748,610 B1 | 9/2023 | Majumder et al. |
| 2004/0010582 A1 | 1/2004 | Oliver |
| 2006/0288346 A1* | 12/2006 | Santos ............... G06F 9/4887 718/102 |
| 2012/0060172 A1* | 3/2012 | Abouzour ........... G06F 9/5027 718/105 |
| 2013/0283265 A1 | 10/2013 | Acharya et al. |
| 2014/0089495 A1 | 3/2014 | Akolkar et al. |
| 2015/0170053 A1 | 6/2015 | Miao |
| 2015/0332169 A1 | 11/2015 | Bivens et al. |
| 2015/0339572 A1 | 11/2015 | Achin et al. |
| 2015/0379072 A1 | 12/2015 | Dirac et al. |
| 2016/0092252 A1 | 3/2016 | Wagner |
| 2016/0093294 A1 | 3/2016 | Kapralova et al. |
| 2016/0197777 A1 | 7/2016 | Tarantino et al. |
| 2016/0210175 A1 | 7/2016 | Morimura et al. |
| 2017/0093639 A1 | 3/2017 | Dabbagh et al. |
| 2017/0111233 A1 | 4/2017 | Kokkula et al. |
| 2017/0148433 A1* | 5/2017 | Catanzaro ........... G06N 3/084 |
| 2017/0161905 A1* | 6/2017 | Reyzin ............... G06T 7/194 |
| 2017/0177860 A1 | 6/2017 | Suarez et al. |
| 2017/0212829 A1 | 7/2017 | Bales et al. |
| 2017/0213156 A1 | 7/2017 | Hammond et al. |
| 2017/0213213 A1 | 7/2017 | Tomlinson, Jr. |
| 2017/0220949 A1 | 8/2017 | Feng et al. |
| 2017/0293859 A1 | 10/2017 | Gusev et al. |
| 2017/0329520 A1* | 11/2017 | Bivens ............... G06Q 30/02 |
| 2018/0053099 A1 | 2/2018 | Beller et al. |
| 2018/0060068 A1 | 3/2018 | Ferrara et al. |
| 2018/0089592 A1 | 3/2018 | Zeiler et al. |
| 2018/0095778 A1 | 4/2018 | Aydelott et al. |
| 2018/0293463 A1 | 10/2018 | Brown |
| 2018/0300653 A1 | 10/2018 | Srinivasan et al. |
| 2018/0324204 A1 | 11/2018 | Mcclory et al. |
| 2018/0336479 A1 | 11/2018 | Guttmann |
| 2018/0359259 A1 | 12/2018 | Leon |
| 2019/0036789 A1 | 1/2019 | Kaplunov et al. |
| 2019/0081955 A1 | 3/2019 | Chugtu et al. |
| 2019/0095794 A1* | 3/2019 | Aldana López ....... G06V 10/82 |
| 2019/0102700 A1 | 4/2019 | Babu et al. |
| 2019/0114370 A1 | 4/2019 | Cerino et al. |
| 2019/0114672 A1 | 4/2019 | Jacobs et al. |
| 2019/0147331 A1* | 5/2019 | Arditi ................. G06N 3/08 706/20 |
| 2019/0156244 A1 | 5/2019 | Faulhaber et al. |
| 2019/0253519 A1 | 8/2019 | Milosevic et al. |
| 2020/0026576 A1 | 1/2020 | Kaplan |
| 2020/0027014 A1 | 1/2020 | Wen et al. |
| 2020/0219028 A1 | 7/2020 | Papaemmanouil et al. |
| 2020/0311617 A1 | 10/2020 | Swan et al. |

FOREIGN PATENT DOCUMENTS

| | | |
|---|---|---|
| CN | 114546391 A | 5/2022 |
| JP | 2017-520068 A | 7/2017 |
| JP | 2017-524183 A | 8/2017 |
| KR | 10-2011-0127498 A | 11/2011 |
| TW | 201705722 A | 2/2017 |
| WO | 2016/053950 A1 | 4/2016 |

OTHER PUBLICATIONS

M. Wajahat, A. Gandhi, A. Karve and A. Kochut, Using machine learning for black-box autoscaling, Seventh International Green and Sustainable Computing Conference (IGSC), 2016 (Year: 2016).*

Hang Qi, Evan R. Sparks, Ameet Talwalkar, Paleo: A Performance Model for Deep Neural Networks, openreview.net, Nov. 2016 (Year: 2016).*

Li, Mu, et al. "Scaling distributed machine learning with the parameter server." 11th {USENIX} Symposium on Operating Systems Design and Implementation ({OSDI} 14). 2014. (Year: 2014).*

Lee, Yun Seong Lee, et al. "Dolphin: Runtime optimization for distributed machine learning." Proc. of ICML ML Systems Workshop. 2016. (Year: 2016).*

Cui, Henggang, et al. "Exploiting iterative-ness for parallel ML computations." Proceedings of the ACM Symposium on Cloud Computing. 2014. (Year: 2014).*

Sun, Chenggen, et al. "DPS: A DSM-based Parameter Server for Machine Learning." Jun. 14, 2017 International Symposium on Pervasive Systems (pp. 20-27). (Year: 2017).*

Harlap, Aaron, et al. "Solving the straggler problem for iterative convergent parallel ML." (2015). (Year: 2015).*

Dean, Jeff, and Rajat Mongaâ TensorFlow. "Large-Scale Machine Learning on Heterogeneous Distributed Systemsâ." TensorFlow.org (2015). (Year: 2015).*

Andrea Matsunaga, On the use of machine learning to predict the time and resources consumed by applications. (Year: 2010).

Non-Final Rejection Mailed on Jan. 25, 2021 for U.S. Appl. No. 15/934,046.

Li, Mu, et al., "Parameter Server for Distributed Machine Learning", Carenegie Mellon University, 10 pages.

Advisory Action, U.S. Appl. No. 15/934,046, filed Jul. 29, 2021, 3 pages.

Advisory Action, U.S. Appl. No. 15/934,046, filed Jul. 29, 2022, 3 pages.

Binbin Yong, Intelligent monitor system based on cloud and convolutional neural network. (Year: 2017).

Eli M. Dow, A Host-Agnostic, Supervised Machine Learning Approach to Automated Overload Detection in Virtual Machine Workloads. (Year: 2017).

Final Office Action, U.S. Appl. No. 15/934,046, filed Jun. 3, 2022, 23 pages.

Final Office Action, U.S. Appl. No. 15/934,046, filed Jun. 11, 2021, 13 pages.

Javier Alonso, Predicting Software Anomalies using Machine Learning Techniques. (Year: 2011).

Non-Final Office Action, U.S. App. No. 15/934,046, filed Oct. 28, 2021, 12 pages.

Notice of Allowance, U.S. App. No. 15/934,046, filed Sep. 1, 2022, 7 pages.

Rohit Punnoose, Prediction of Employee Turnover in Organizations using Machine Learning Algorithms. (Year: 2016).

Graepel, Thore, Kristin Lauter, and Michael Naehrig, "ML confidential: Machine learning on encrypted data." International Conference on Information Security and Cryptology. Springer, Berlin, Heidelberg, 2012. (Year: 2012).

Wendell, Patrick, et al. "Donar: decentralized server selection for cloud services." Proceedings of the ACM SIGCOMM 2010 conference. 2010. (Year: 2010).

Final Rejection, U.S. App. No. 15/950, 131, filed Mar. 20, 2023, 15 pages.

International Search Report and Written Opinion for International Application No. PCT/US2018/062064, Notification mailed Feb. 20, 2019.

Non-Final Rejection, U.S. Appl. No. 15/821,585, filed Aug. 30, 2022, 13 pages.

Notice of Allowance, U.S. Appl. No. 15/821,585, filed Jun. 14, 2023, 7 pages.

(56) References Cited

OTHER PUBLICATIONS

Notice of Allowance, U.S. Appl. No. 15/821,585, filed Jun. 22, 2023, 2 pages.

\* cited by examiner

*FIG. 3*

IN-FLIGHT SCALING OF MACHINE LEARNING TRAINING JOBS

CROSS-REFERENCE TO RELATED APPLICATIONS

This application claims the benefit of U.S. Provisional Application No. 62/590,134, filed Nov. 22, 2017, which is hereby incorporated by reference.

BACKGROUND

The field of machine learning has become widely acknowledged as a likely significant driver of the future of technology. Organizations everywhere now seek to use machine learning techniques to address a wide variety of problems, such as optimizing aspects of their products, processes, customer experience, etc. While the high-level view of machine learning sounds simple—e.g., provide training data to a computer, to allow the computer to automatically learn from the training data to generate a model that can make predictions for other data-implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which:

FIG. 3 is a diagram illustrating exemplary machine learning training job metadata records according to some embodiments.

DETAILED DESCRIPTION

Figure 1:
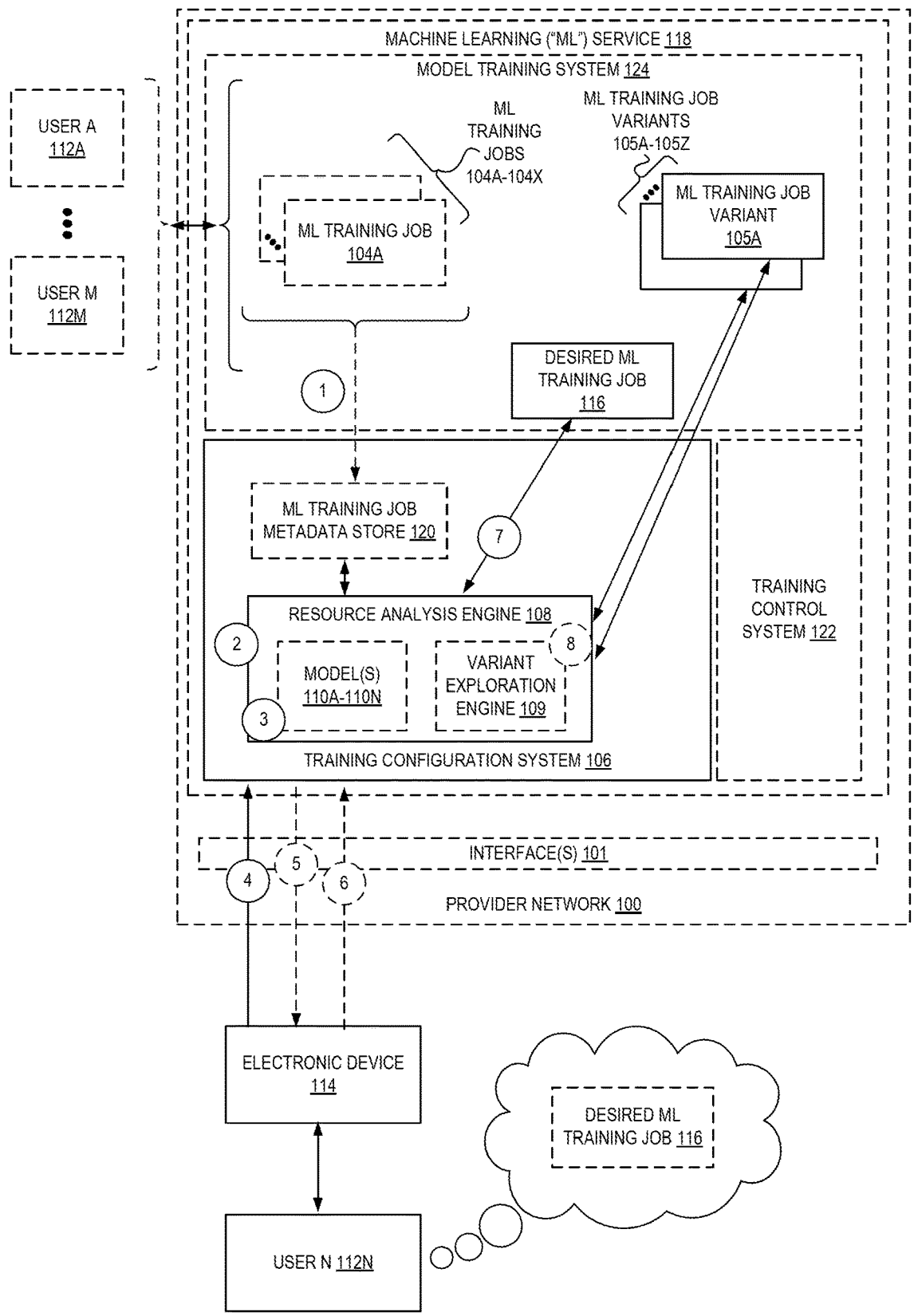
FIG. 1 is a diagram illustrating an environment for intelligent compute resource selection and utilization for machine learning training jobs according to some embodiments.

Various embodiments of methods, apparatus, systems, and non-transitory computer-readable storage media for machine learning job resource prediction and selection and dynamic scaling of machine learning training job workers are described.

In some embodiments, characteristics of a desired machine learning (ML) training job can be automatically determined and used to provide configuration recommendations to a user and/or select optimal configurations for the ML training job according to some desired performance characteristic. In some embodiments, at least a portion of a ML training job is executed a plurality of times using a plurality of different resource configurations, where each of the plurality of resource configurations includes at least a different type or amount of compute instances. A performance metric can be measured for each of the plurality of the executions, and used (at least in part) with a desired performance characteristic to generate one or more recommended resource configurations for the ML training job. The one or more recommended resource configurations can be provided to the user as recommendations, one of which could be selected by the user to be utilized for the training job. Alternatively or additionally, the ML training job can be executed using one of the one or more recommended resource configurations.

In some embodiments, machine learning training job workers can be dynamically scaled to adapt the rate of training and/or the amount and/or type of compute resources involved. In some embodiments, a request is received to execute a ML training job within a provider network, and the ML training job can be executed using a first one or more compute instances. In some embodiments, a performance characteristic of the ML training job can be determined to satisfy a scaling condition, and a second one or more compute instances can be added to the ML training job while the first one or more compute instances continue to execute portions of the ML training job. Additionally or alternatively, a performance characteristic of the ML training job can be determined to satisfy a scaling condition and as a result, one or more compute instances can be removed from the ML training job while other one or more compute instances can continue to execute portions of the ML training job.

As introduced herein, machine learning and data analysis algorithms can be applied to many domains, ranging from medical image analysis, to insurance, fraud detection, and social networking (e.g., image and text understanding, graph analysis), etc. With advances in artificial intelligence and related applications, more and more users are starting to engage with these systems. However, being able to train models effectively still remains an art. The choices one makes for machine learning algorithms, the computing resources used to train a model, the algorithm parameters used while training these models, etc., can impact the overall amount of training time, the cost to train, the quality of trained models, etc.

As machine learning training typically involves processing large amounts of data to create models, such training jobs are very resource intensive and therefore are often distributed across several machines. However, provisioning the right resources for such jobs is extremely difficult. For example, there is a very complex dependency between the statistics of the training data, the ML algorithm's logic, the hardware specifications of the compute resources involved, the number of machines involved, the model accuracy desired, the time to completion, and even an eventual cost.

Thus, when a ML model training jobs are launched, it is commonly a large, intensive endeavor involving many systems. When such jobs are initiated, the types and amounts of compute resources (e.g., virtual machines, physical hosts, etc.) are commonly specified by the calling user. For example, a user may provide a request to start training a model X using training data Y on virtual machine type Z, where W of these virtual machines (of type Z) are to perform the learning job together in a cluster.

As a result of such a system setup for training ML models, several problems tend to result. One significant problem is that users often under-provision or over-provision resources significantly, due to lack of knowledge of what resources are required, an overabundance of caution, etc. As a result, ML model training jobs may not function properly or may be particularly slow-running (in the case of under-provisioning), or the jobs may "waste" resources (in the case of over-provisioning) when fewer resources could have been used to satisfy the user. Additionally, it is possible that through over-provisioning, a ML model training job could be performed even slower due to increased configuration costs, inter-communication costs, etc.

Accordingly, while a ML service should provide its users the best possible experience, such under- and/or over-provisioning is extremely common and significantly impacts the user experience. However, performing the proper provisioning for a ML training job is especially difficult, as a ML service does not have the complete knowledge of what resources the ML job may require. For example, it may be the case that users themselves provide the code/logic to perform the machine learning, and neither the users nor the machine learning service may know exactly what operations need to be performed, what training data is involved, etc., and thus what exact resources would optimally be utilized.

Embodiments disclosed herein provide techniques and systems for addressing these and other issues. FIG. 1 is a diagram illustrating an environment for intelligent compute resource selection and utilization for machine learning training jobs according to some embodiments. This environment includes a resource analysis engine 108, which may optionally operate as part of a provider network 100, and may comprise one or more software modules executed by one or more electronic devices at one or more data centers and/or geographic locations.

In some embodiments, a best "hardware" setup (e.g., in terms of virtual machines and/or the underlying hosts) can be determined for a ML training job by a resource analysis engine 108 of a training configuration system 106, e.g., based on parameters of the ML training job, potentially before its initiation. Embodiments can predictively determine how much time and energy would be required for a particular job. In some embodiments, additional machine learning jobs (or similar statistical models) can be trained by the resource analysis engine 108 (e.g., a software module executed by one or more computing devices) to determine, for a particular ML training job having particular characteristics (e.g., using a type of data, for a particular type of algorithms, using particular types of machines, using particular numbers of machines), how much time the job may take for the ML training job to conclude, how much of cost is incurred, etc.

In some embodiments, the training configuration system 106 can be provided via a machine learning service 118 of a provider network 100. A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage), network-related resources (e.g., configuring virtual networks including groups of compute resources, content delivery networks (CDNs), Domain Name Service (DNS)), application resources (e.g., databases, application build/deployment services), etc. These and other computing resources may be provided as services, such as a hardware virtualization service that can execute compute instances, a storage virtualization service that can store data objects, a machine learning service 118 that can train and/or host ML models, etc. The users (or "customers") of a provider network 100 may utilize one or more user accounts that are associated with a customer account, though these terms may be used somewhat interchangeably depend ending upon the context of use. Users may interact with a provider network 100 across one or more (non-illustrated) intermediate networks (e.g., the internet) via one or more interface(s) 101, such as through use of application programming interface (API) calls, via a console implemented as a website or application, etc. The interface(s) 101 may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network 100 or a service thereof, which in turn utilizes a compute instance to execute the code (often without the user having any control of or knowledge of the underlying compute instance(s) involved).

In some embodiments, the training configuration system 106 can collect data at (1) to perform ML training job related inference by analyzing at (2) a large number of machine learning training jobs 104A-104X (with different configurations) performed on behalf of a variety of different users 112A-112M. Accordingly, a ML training job metadata store 120 of the training configuration system 106 can collect this data, and the resource analysis engine 108 can generate one or more models 110A-110N (ML models, statistical models, etc.) at (3) based on this data to allow the resource analysis engine 108 to determine an anticipated outcome (e.g., one or more of time, cost, utilization, performance, etc.) for a new ML training job. Upon the user submitting a request to perform a training job at (4), the anticipated outcome (or many anticipated outcomes assuming differing job characteristics for the job, such as different numbers/types of virtual machines executing the jobs) can optionally be provided to the user 112N (via electronic device 114) at (5) and thus the user may cause a request to be sent at (6) to launch the ML training job at (7) using a particular resource configuration that is desirable to the user. Alternatively, the ML service 118 can use the anticipated outcome (or many anticipated outcomes assuming differing job characteristics for the job, such as different numbers/types of virtual machines executing the jobs) to launch resources for the job at (7), possibly before the job is even requested to be launched (e.g., at (6)), optionally by selecting a particular resource configuration that maximizes or minimizes an anticipated outcome.

To collect data, observable characteristics can be provided to the resource analysis engine 108 directly or indirectly (e.g., by being stored in a ML training job metadata store 120), such as a size of a model or container (including the logic for training), a number of virtual or physical machines used for the job (e.g., twenty compute instances), a time to completion, etc.

For example, the ML job metadata store 120 can store some or all of a variety of types of information, such as the particular types and values of hyperparameters used in the modeling/learning task, features of the application area to which the model resulting from the desired ML job 116 pertains (such as natural language processing, imaging, risk modeling, demand forecasting, insurance, etc.), features of the training data (such as the size, number of rows, number of features, class-ratios, mean, standard deviation of features, etc.), features of the learning task (such as the type or methods of algorithm, e.g., classification, regression, clustering, linear discriminant analysis, logistic regression, support vector machines (SVM), neural networks), performance metrics (e.g., Area Under Curve (AUC), precision, recall, root mean square error (RMSE), accuracy, log-likelihood, training time, time for one epoch, hardware cost, etc.). In some embodiments, the ML job metadata store 120 can store data characteristics such as the size and/or type of data attributes, the number of data attributes, attribute-wise statistics (e.g., mean, percentiles, etc.). Some examples data collected and stored by ML job metadata store 120 are shown later herein with regard to FIG. 3.

With regard to FIG. 1, the resource analysis engine 108 can additionally or alternatively analyze a particular machine learning job itself—e.g., the size of the training data, the sparsity of the training data, etc. For example, the resource analysis engine 108 could run its own ML model(s) 110A-110N to determine the complexity, etc., of the data.

For example, if a user 112A is performing principal component analysis (PCA), the size of the training data may not be indicative of any performance characteristics, although some internal characteristics of the data (e.g., the number of records multiplied by the square of the dimensions/features, geometric interpretation of the data such as the density of features, etc.) can be extremely predictive. PCA is an unsupervised learning algorithm that attempts to reduce the dimensionality (number of features) within a dataset while still retaining as much information as possible. This is done by finding a new set of features called components, which are composites of the original features that are uncorrelated with one another. They are also constrained so that the first component accounts for the largest possible variability in the data, the second component the second most variability, and so on.

Additionally or alternatively, in some embodiments the training configuration system 106 can duplicate certain ML training jobs with different characteristics to determine what the resulting execution characteristics/metrics for the job look like.

For example, in some embodiments, if some user 112N seeks to launch a desired ML training job 116 with a certain amount/type of resource characteristics (e.g., twenty type 'A' VMs), in some embodiments the resource analysis engine 108 can duplicate the same job with different characteristics at (8) (e.g., using different numbers/types of compute instances determined by a variant exploration engine 109 component) and collect metrics (e.g., directly, or via ML training job metadata store 120) for each such duplicated job 105A to determine performance characteristics associated with the different characteristics.

As a result, for a particular ML training job or type of ML training job, in some embodiments the resource analysis engine 108 can determine the different performance characteristics. For example, ML training jobs having "perfect scaling" characteristics (that are very parallelizable, where adding an additional instance to an existing instance can approximately double performance) can be identified that are easy to distribute across multiple compute instances. Similarly, jobs that do not have perfect scaling characteristics (e.g., due to issues with extra communication overhead that is burdensome, etc.) can be identified that are not easy to distribute across multiple compute instances.

In some embodiments, by running a same ML training job with different resource configurations (e.g., virtual machines and/or types thereof), a model (e.g., 110A) can be generated (e.g., using interpolation techniques) by the resource analysis engine 108 that indicates different likely performance results using different resource configurations. With this model 110A, suggestions can be provided to users seeking to execute a job, allowing the user to select particular configurations that best suit their needs (e.g., execute faster, execute with a minimal cost, a combination thereof, etc.). Thus, a particular ML training job can be submitted to the training configuration system 106, and resultant execution characteristics for different configurations can be identified and selected or presented to the user.

In some embodiments, some or all of these techniques can be performed ahead of time for particular ML algorithms (e.g., containers including ML code) that may be used by multiple users of the ML service 118, so that suggested configurations and execution characteristics can be presented when a user wishes to use one of these algorithms.

In some embodiments, some or all of these techniques can be performed responsive to a user request involving a particular algorithm (e.g., a container, which may be a customer container provided/created by the customer). Thus, before the user uses that container, or perhaps after the user uses that container for an ML task, suggested configurations and execution characteristics can be generated and presented to the user.

In some embodiments, an API call used to create a new ML job can allow a user to specify a preference (or "performance characteristic") regarding the execution of the job (e.g., a priority level such as "high" or "medium" or "low", a desired maximal or minimal execution time, a desired maximal or minimal cost, etc.), thus instructing the machine learning service 118 to select an optimal resource configuration (e.g., types and/or amounts of VMs for executing a container) based on the specified preference.

For example, in some embodiments, an "analyze performance of job" routine can be utilized in the ML service 118 (e.g., responsive to a request submitted by an electronic device of a user) that accepts a particular ML algorithm and training data (identified and/or provided by a user request), and the resource analysis engine 108 can run experiments (e.g., using different combinations of resource configurations selected by variant exploration engine 109, analysis of other similar jobs previously run by the model training system 124, etc.) to determine how the ML training job could be run and what results would occur under these different configurations. As one example, a particular job could be run with a single compute instance of type 'A', with two compute instances of type 'A', and/or with four compute instances of type 'A', to determine whether (and how much) the job "scales" well, enabling the resource analysis engine 108 to make fairly accurate predictions about the performance of using different numbers of compute instances to perform the ML training job. As another example, a particular job could be run with variants utilizing different types of compute instances (having different resource characteristics) to determine how differing resource types/amounts (e.g., random access memory (RAM), available bandwidth, accelerators, etc.) affects the job, again enabling the resource analysis engine 108 to make fairly accurate predictions about the performance resulting from use of different types of compute instances to perform the ML training job.

Figure 4:
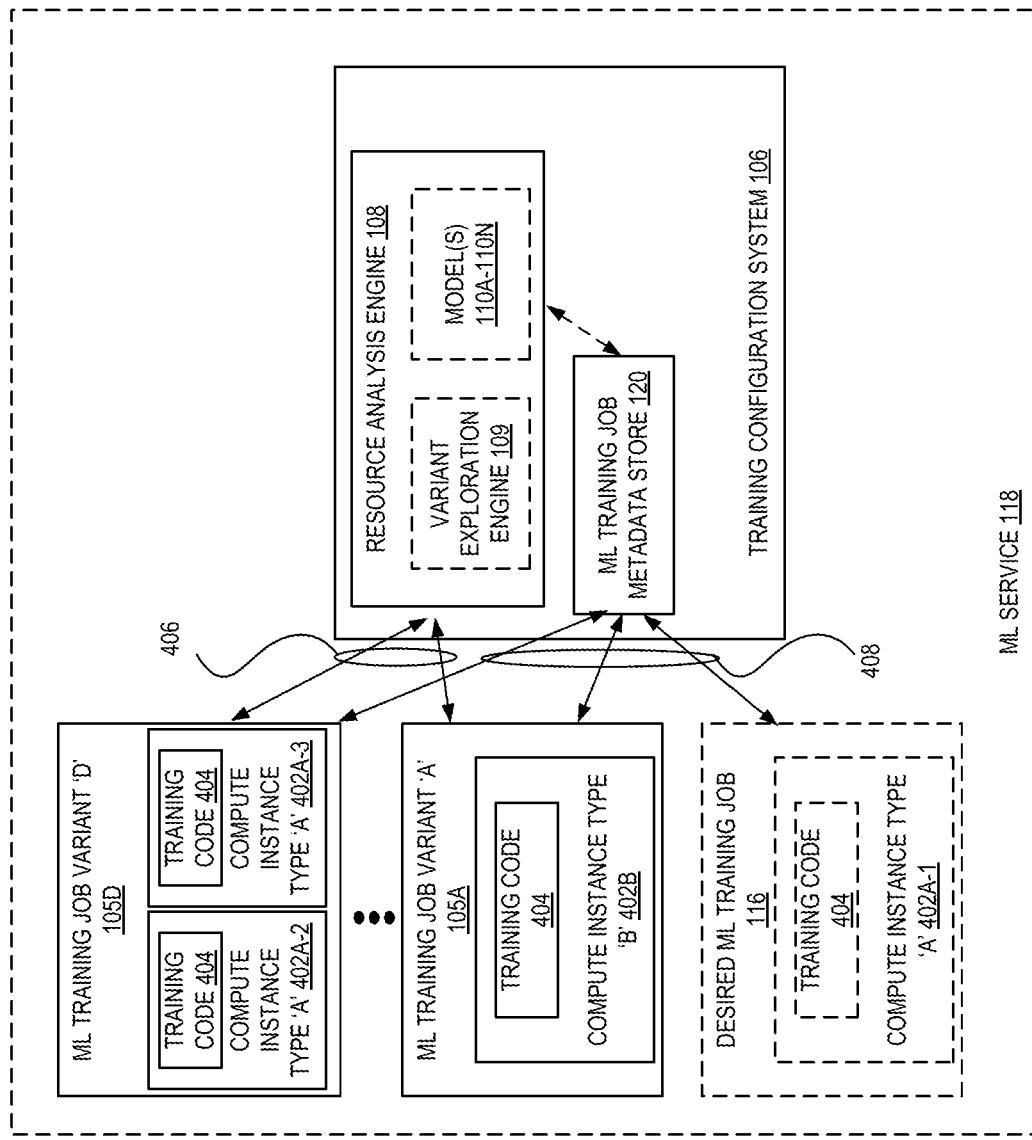
FIG. 4 is a diagram illustrating an environment for machine learning training job variant exploration according to some embodiments.

For example, turning ahead to FIG. 4, a diagram is shown illustrating an environment for machine learning training job variant exploration according to some embodiments. For a desired ML training job 116 (that may be submitted but not yet run, or submitted and running), the training configuration system 106 can explore the characteristics of the job using variants. Thus, the variant exploration engine 109 can generate variants of the desired job, e.g., by identifying different numbers of compute instances to use and/or different types of compute instances to use. Thereafter, the resource analysis engine 108 can run (or cause to run, via sending a message to a model training system, shown via arrow 406)—at least for an amount of time long enough to observe "stable" performance of the job, which typically does not require actually performing the entire training run-one or more variants 105A-105D. As shown, a variant 'A' 105A is run with the training code 404 executed by a compute instance of type 'B' 402B, which is different than the compute instance of type 'A' 402A-1 originally selected for the desired job 116. Another shown variant is variant 'D' 105D, which runs the training job using two compute instances of type 'A' 402A-2 and 402A-3. The results of these variant training runs can be provided at arrows 408 back to the ML training job metadata store 120 (or directly back to the resource analysis engine 108). Thereafter, via analysis (e.g., statistical techniques) and/or use of one or more models 110A-110N, the resource analysis engine 108 can generate one or more recommended resource configurations, ones of which may be chosen to maximize or minimize a particular performance characteristic (e.g., shortest running time, smallest expense, fewest number of instances, etc.). These one or more recommended resource configurations can be provided back to the user, or can be used to automatically run the desired ML training job 116—possibly with a different resource configuration than originally sought.

Accordingly, in some embodiments, one or more possible resource configurations (and optionally corresponding predicted outcomes) can be provided to a user, allowing the user to launch a job using one of the presented recommended configurations. Moreover, in some embodiments, a user can launch a job and indicate a preference (or requirement) in the request, e.g., "have the job complete within an hour", "train the model until a particular accuracy of the model is reached," etc., and the training configuration system 106 can determine the best set of resources for the job and execute the job to satisfy the user's stated preference(s).

Figure 2:
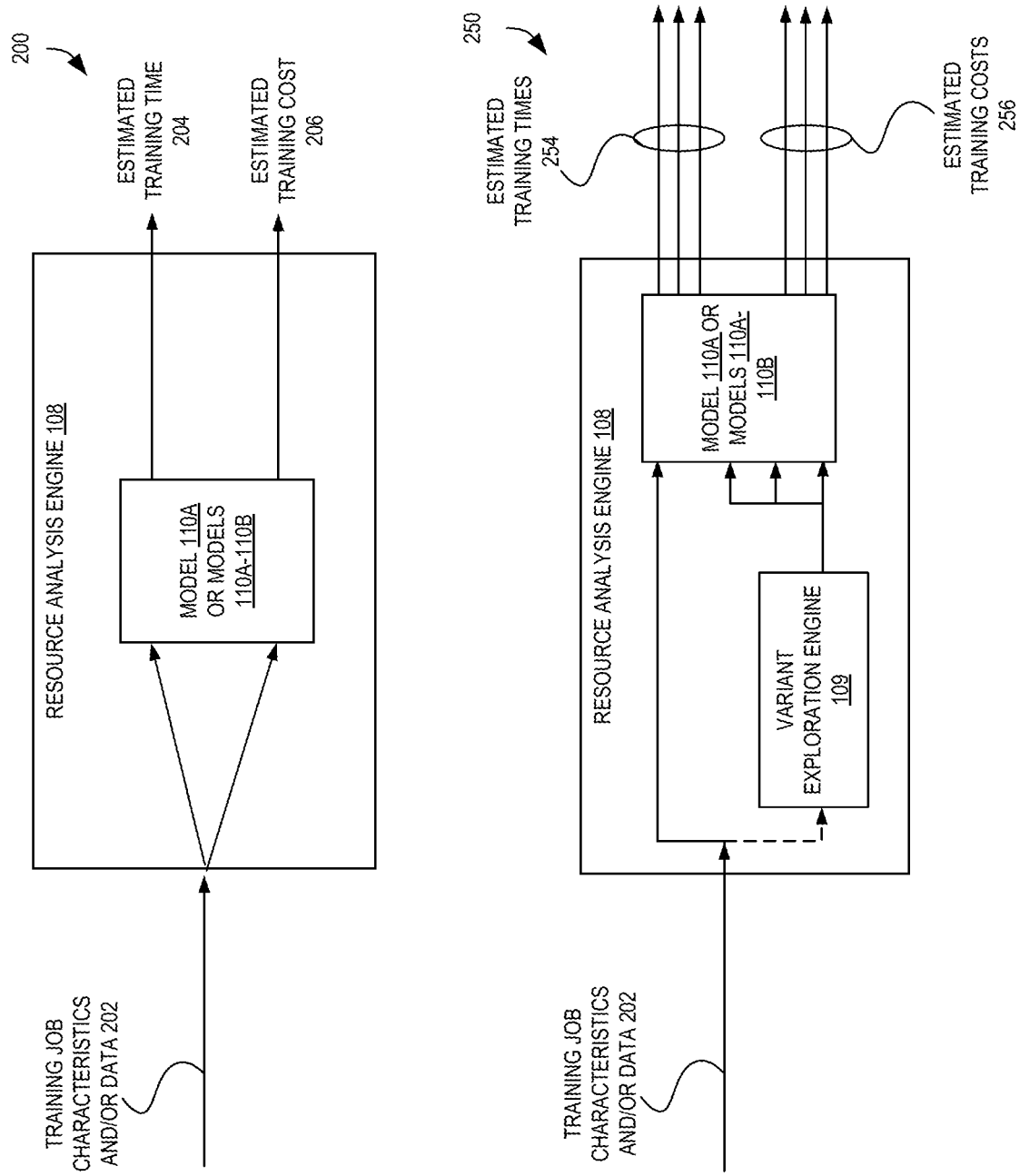
FIG. 2 is a diagram illustrating machine learning predictive analysis according to some embodiments.

To further explore the various types of user feedback, FIG. 2 is a diagram illustrating machine learning predictive analysis according to some embodiments. At 200, training job characteristics and/or training data 202 can be provided to the resource analysis engine 108, which can use this data 202 with one or multiple models 110A-110B to generate estimated values—e.g., an estimated training time 204, an estimated training cost 206, etc. Similarly, at 250, training job characteristics and/or training data 202 can be provided to the resource analysis engine 108, which can be similarly provided to one or multiple models 110A-110B to generate estimated values, and can also be provided to the variant exploration engine 109 to generate variants as described herein. Identifiers of the variants can also be provided to the one or multiple models 110A-110B to generate estimated values, which can be combined with the other generated estimated values to yield, e.g., estimated training times 254, estimated training costs 256, etc.

Figure 3:
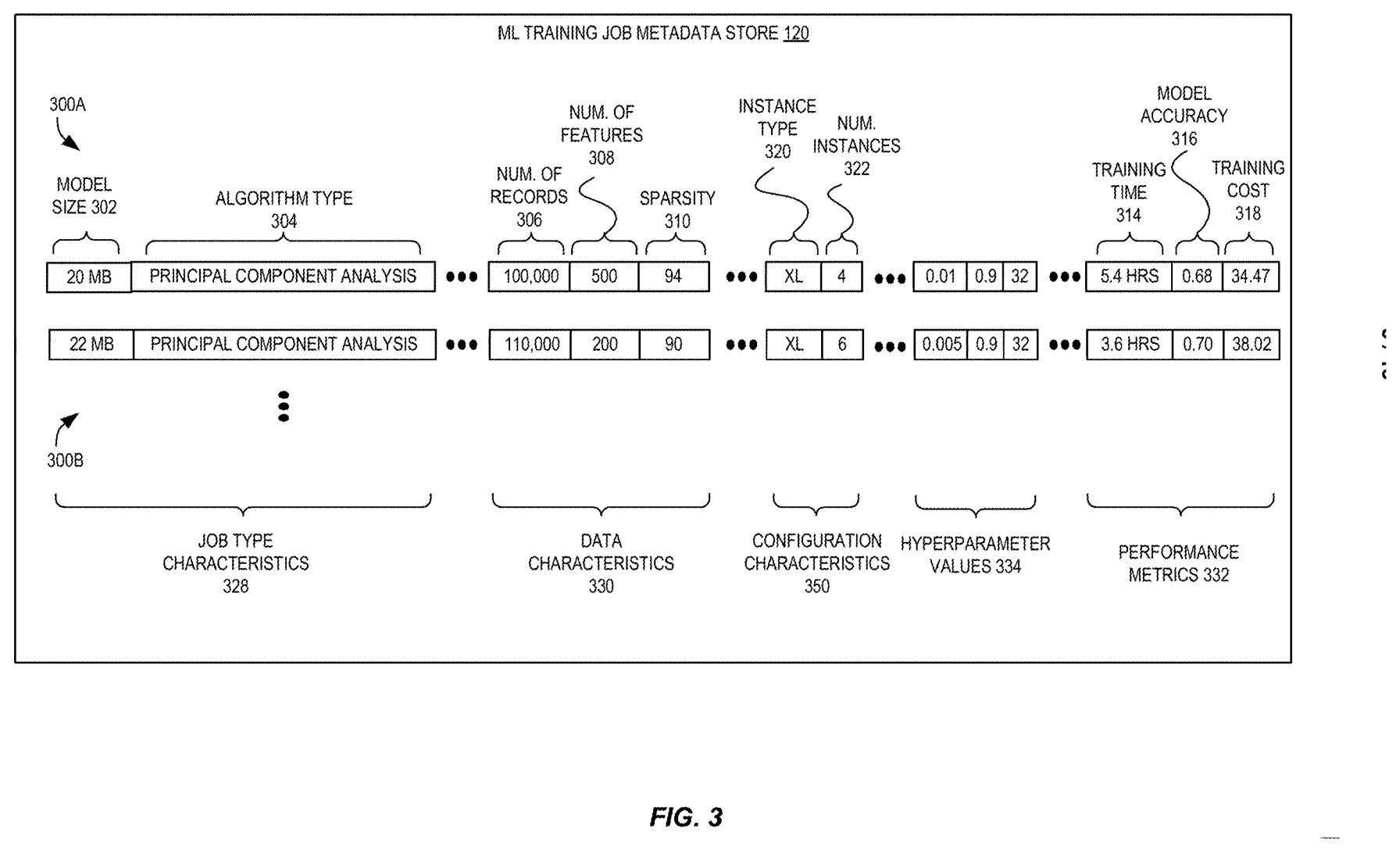

FIG. 3 is a diagram illustrating exemplary machine learning training job metadata records according to some embodiments. In this figure, two exemplary entries 300A-300B of the ML training job metadata store 120 are shown for the sake of understanding and clarity; however, it is to be understood that in many embodiments there will be far more entries. Additionally, in this figure some exemplary types of values are shown as belonging to each entry, though in various embodiments there can be more, fewer, and/or different numbers and types of values. Moreover, although these entries are shown in a row-based format for ease of understanding, it is to be understood that in many embodiments other formats/structures are utilized.

In this example, each entry is shown as including two job type characteristics 328, three data characteristics 330, two configuration characteristics 350, and three performance metrics 332.

The job type characteristics 328 include a model size 302 and an algorithm type 304. The model size 302 can indicate how the large of a model is to be used for training (e.g., a size of ML training logic, a size of a container encapsulating ML training logic, etc.). In some embodiments, this value is provided explicitly by a user (e.g., in a drop-down user interface (UI) element allowing the user to select between a variety of choices, and/or provided in an API call), and in some embodiments the value is inferred. In some embodiments, the algorithm type 304 identifies a particular type of ML algorithm to be trained, e.g., a linear classifier, neural network (e.g., convolutional neural network (CNN)), a particular Apache MXNet algorithm, an XGBoost classifier, a support vector machine, etc. Similarly, in some embodiments, this value is provided explicitly by a user and in some embodiments the value is inferred.

The data characteristics 330 include a number of training records 306, a number of features 308, and a sparsity 310, though of course more, fewer, and/or other types of characteristics can be used. The number of training records 306 can refer to the size of the training data (conceptually a number of rows, such as one-hundred million rows, one billion rows, ten thousand rows). The number of features 308 may refer to the number of features each training data element includes, and the sparsity 310 may refer to density of values in the training data. Of course, other types of data characteristics 330 can be used, such as a number of different features for each element of training data, a storage size of the training data (e.g., a number of gigabytes (GBs) or terabytes (TBs), etc.), a class ratio of the training data (e.g., 99% negative and 1% positive), etc.

The configuration characteristics 350 can include an instance type 320 value indicating a type of compute instance (e.g., virtual machine) used for the training job (e.g., from potentially multiple different "types" made available by a provider network 100). The configuration characteristics 350 can also include a number of instances 322 used (e.g., as part of a training cluster) of the instance type 320.

The performance metrics 332 can include a training time 314, a model accuracy 316 indicating an accuracy, loss, root mean square (RMS), mean absolute error, etc., of a model resulting from the training, a training cost 318 indicating a cost such as a financial cost of training the model, a number or amount of resources needed to train the model, etc.

The entries can also include other types of characteristics or metrics as described herein. For example, the entries could include hyperparameter values 434. In machine learning, the term hyperparameter is used to distinguish from standard model parameters. A machine learning model can be thought of as the definition of a mathematical formula with a number of parameters that need to be learned from training data, and thus a model is fit to data via a process referred to as model training, which fits the model parameters. However, another kind of parameters that cannot be directly learned from the regular training process may be referred to as hyperparameters, which express "higher-level" properties of the model such as its complexity or how fast it should learn. Hyperparameters are usually set before the actual training process begins and thus affect how the training occurs. The selection of particular hyperparameters for a training job is often left to domain experts, who may set different values for those hyperparameters to train multiple different variants of a model, and then determine which resultant models are the best. Thus, hyperparameters can be thought of as "knobs" that can be adjusted when building/tuning a machine learning model, and typically many different values and combinations of hyperparameters are used to train multiple versions of a model.

Accordingly, the type and number of hyperparameters 434 may depend upon the particular algorithm type 304 (or implementation thereof), and could include any number or type of hyperparameters 434, such as an initial learning rate, a decay rate, a mini batch size, a momentum, a number of training steps per iteration, a maximum depth, a subsample value, etc. Again, a wide number and variety of hyperparameters may be used for different algorithms—e.g., for an XGBoost tree boost algorithm, hyperparameters could include an "eta" hyperparameter indicating a step size shrinkage, a gamma hyperparameter indicating a minimum loss reduction required to make a further partition on a leaf node, a maximum depth of a tree, a minimum sum of an instance weight in a child, a maximum delta step allowed for weight estimation, etc.

As shown, the two entries 300A-300B are nearly the same and may represent two different training job runs where a different number of instances was changed between runs (from 4 to 6), here resulting in a different training time 314 (from 5.4 hours to 3.6 hours).

In some embodiments, the resource analysis engine 108 may use these entries to train a model, which can thus be used with features provided by the user or inferred as inputs to output desired values.

Figure 5:
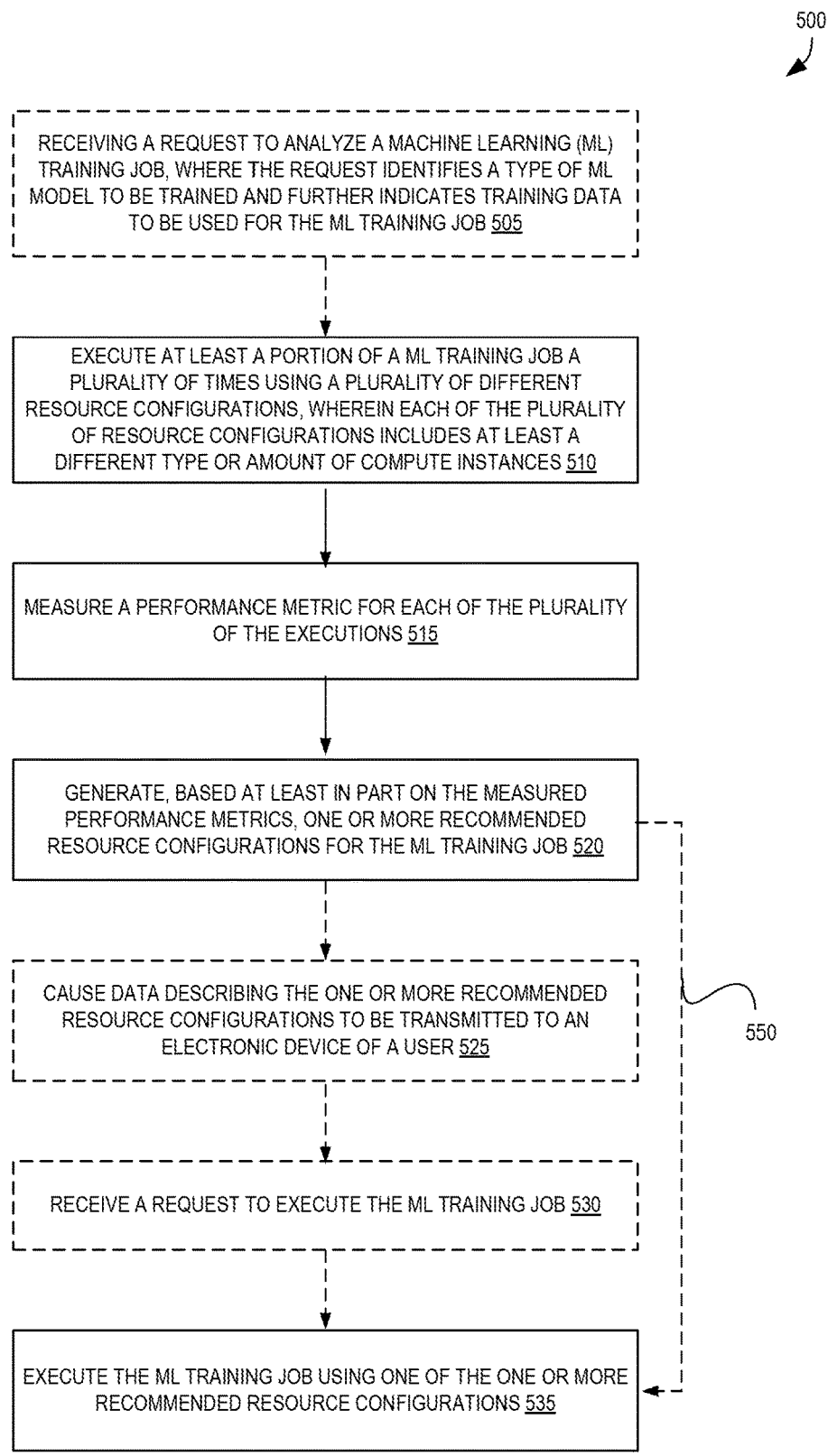
FIG. 5 is a flow diagram illustrating operations (e.g., of a method) for intelligent compute resource selection and utilization for machine learning training jobs according to some embodiments.

FIG. 5 is a flow diagram illustrating operations 500 (e.g., of a method) for intelligent compute resource selection and utilization for machine learning training jobs according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the training configuration system 106 and/or model training system 124 of the other figures.

The operations 500 optionally include, at block 505, receiving a request to analyze a ML training job, where the request identifies a type of ML model to be trained and further indicates training data to be used for the ML training job. The request may be received at an interface of a provider network, or at an interface of a machine learning service. The request may be originated by an electronic device of a user. At block 510, the operations 500 include executing at least a portion of a ML training job a plurality of times using a plurality of different resource configurations, wherein each of the plurality of resource configurations includes at least a different type or amount of compute instances 510.

At block 515, the operations 500 include measuring a performance metric for each of the plurality of the executions. The performance metric may include, for example, an actual or estimated time to completion, an actual or estimated cost, an actual or estimated resultant accuracy of the model, etc. At block 520, the operations 500 include generating, based at least in part on the measured performance metrics, one or more recommended resource configurations for the ML training job. Block 520 could include, for example, selecting a recommended resource configuration that should yield a fastest training time, a least-expensive option, etc.

Optionally, the flow of operations 500 can continue via path 550 to block 535, and executing the ML training job using one of the one or more recommended resource configurations. This block may be performed by selecting one of the one or more recommended resource configurations, which may occur according to a preference (e.g., indicated in the request of optional block 505) indicating a desired performance characteristic (e.g., a fastest training time, a lowest cost).

Alternatively, the flow of operations 500 can continue at optional block 525, and causing data describing the one or more recommended resource configurations to be transmitted to an electronic device of a user, and at optional block 530, receiving a request to execute the ML training job, which may identify one of the recommended resource configurations, specify a completely different resource configuration, etc. The flow may then continue to block 535 as discussed above.

Figure 6:
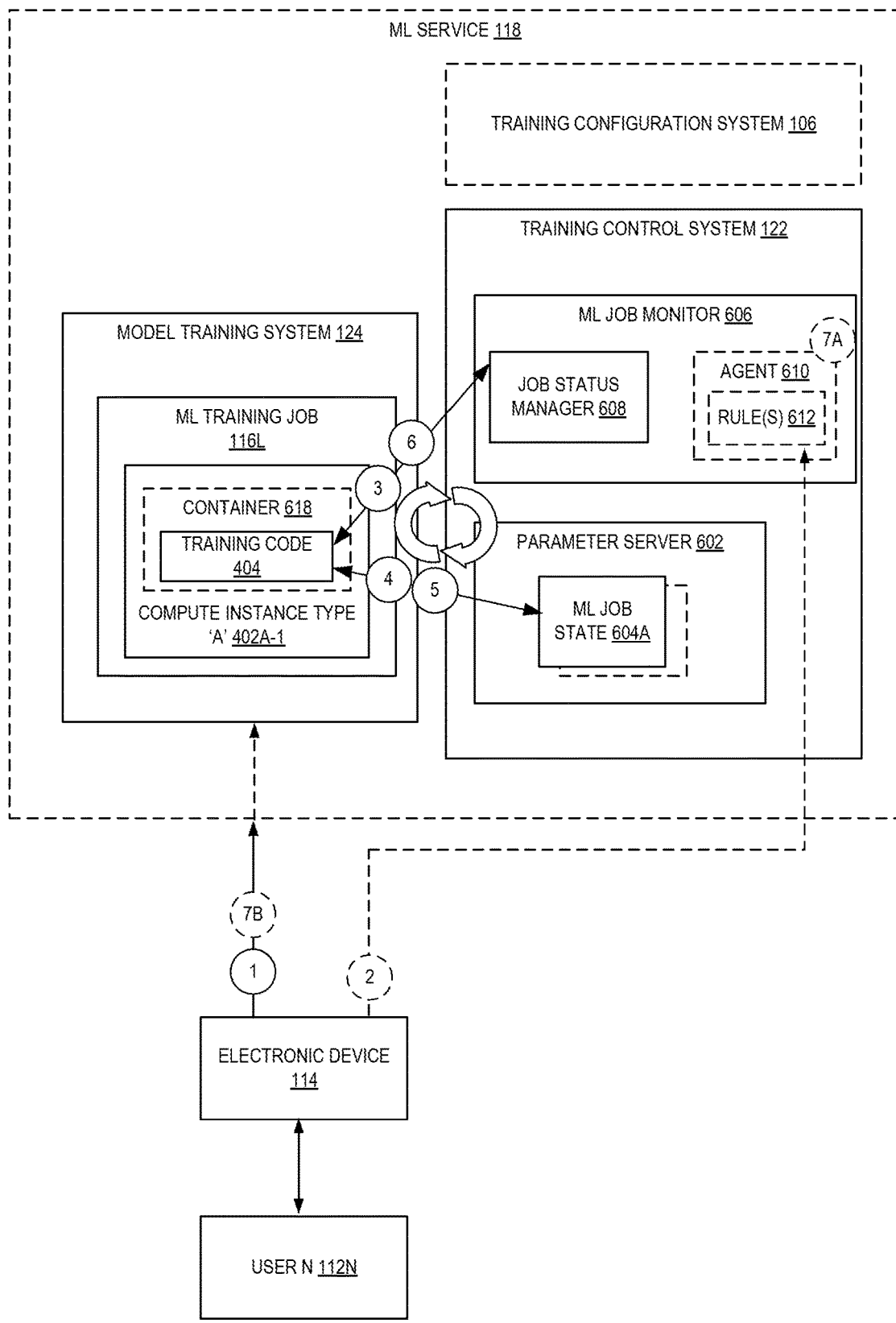
FIG. 6 is a diagram illustrating an environment for scalable machine learning training jobs according to some embodiments.

In some embodiments, machine learning training job "worker" compute instances can be dynamically scaled to adapt the rate of training and/or the amount and/or type of compute resources involved. For example, FIG. 6 is a diagram illustrating an environment for scalable machine learning training jobs according to some embodiments.

In some embodiments, the resources or "hardware" (e.g., compute instances such as software VMs, and/or the host devices that execute them) for an already-running machine learning job can be dynamically added and/or removed, e.g., to meet service level agreements (SLAs), improve the efficiency of the job, reduce a cost/footprint of the job, etc. As the exact performance characteristics of a ML job are difficult to deduce, it is difficult to determine precisely which resources will be needed for the job. For example, although the above-described techniques can be utilized to determine likely beneficial resource configurations, some systems may not employ those predictive techniques, and further, it may be possible that the actual performance of a training job is not the same as predicted, or the user—possibly during training—may have changed his/her desire for what preferred characteristics is to be optimized for.

Thus, if a machine learning training job is not performant or struggling in some manner (or meeting the current desires of the user), one naive way to address the problem is to completely stop the job, and start the job over on different resources that may be more well-suited (e.g., have more processing and/or memory capabilities, etc.) for the task. However, this approach is wasteful, as a job may be a substantially complete when the initial job is terminated, and this portion must then be re-performed by the "new" instances.

In some embodiments, a ML training job can be launched using a first set of resources (e.g., a virtual machine with a small amount of resources (e.g., compute, storage, memory, etc.)) at (1)—here, the ML training job 116L includes a compute instance of type 'A' 402A-1, which includes training code 404 (e.g., within a container 618). For some cases, such a "small" machine may be sufficiently performant for the task. However, in some cases, the small machine may be non-well suited for the complete task—e.g., data ingress is bottlenecking, processing is overloaded, etc.

Thus, in some embodiments, the training control system 122 can monitor the execution and progress of the current utilized resources (e.g., the small VM), determine that the performance/progress of the ML job is not satisfactory (e.g., is greater than or less than some defined threshold), and add additional resources such as additional virtual machines (to execute additional containers for the ML task) to "scale up" the task. The additional VMs may be selected based on which execution characteristics were determined to be problematic—e.g., if data ingress for the job is lacking, another one or more VMs can be launched that include a better ratio of I/O bandwidth to CPU, for example. Thus, the system (e.g., a job status manager 608) can continue monitoring the execution/progress of the task across the involved VMs, and if bottlenecks or other performance issues still arise, the training control system 122 can continue to add additional compute instances (e.g., VMs) of a same or different type, to improve the performance of the job.

Thus, in some embodiments, the architecture of the machine learning service can add—or subtract-resources, on the fly, without needing to restart the machine learning job. Instead, as a current "state" of the job is tracked by the machine learning system (e.g., a parameter server 602), a newly-added resource can determine which tasks for the job remain and work on those, while the existing completed tasks can be kept.

Optionally, at (2), a message can be sent from the electronic device 114 of the user 112N to configure one or more scaling rules 612 to be used by an agent 610 to determine if and when a scaling up or down of compute instances is to occur. For example, the rules 612 may include a rule with a scaling condition that can be evaluated using one or more performance characteristics of the job. The scaling condition could be satisfied when, for example, a learning rate meets or exceeds a threshold, a predicated training time meets or exceeds a threshold, etc.

To enable such scaling of in-progress ML training jobs, embodiments utilize jobs that can be "paused" to a consistent state. In some embodiments, the ML models trained by the machine learning system have such a property in that they have a tracked "state" 604A—e.g., a "shared learned model" and optionally other parameters used for learning. Thus, the compute instances working on a ML training job may persist their state to a central location such that it may be consistent and centrally-tracked.

In some embodiments, a parameter server 602 persists and manages machine learning job states 604A-604Z. Thus, a new worker (e.g., a compute instance 402A-1 VM executing a container 618 including machine learning code 404 ("logic") for learning a model) added to a group of one or more existing machines running a ML training job can contact the job status manager 608 at (3) and, e.g., provide it with an identifier of the training job that it is to join. The job status manager 608 can provide, in response, one or more of: an identifier of the parameter server 602 that the worker is to utilize (e.g., that tracks state for the identified job), identifiers of a set of data (e.g., a set of one or more files or data structures) to process, an identifier of a container 618 and/or training code 404 to use, etc. The set of data (e.g., a set of one or more files or data structures) to process may be marked by the job status manager as being worked on or "in progress."

The worker compute instance 402A-1 may then obtain and/or load the container 618/code 404, load the set of data, and at (4) interact with the parameter server 602 to get the latest (or "current") state to determine what to update on, and perform its training tasks. Upon the end of those tasks for that data, at (5) the worker compute instance 402A-1 can send a state update to the parameter server 602, and then go interact at (6) with the progress manager to indicate that the "chunk" of data it was working on is complete. Some or all of set of operations may repeat, and thus, the worker compute instance 402A-1 may obtain additional data to work on from the job status manager 608, and so on.

Thus, new and/or different machines can be added to a ML task to perform work on the task essentially through interacting with the parameter server 602. Accordingly, what machines do for the job is completely independent of how long a machine has been working on the ML task.

As indicated above, in some embodiments, the progress of a ML task can be monitored (e.g., by a ML job monitor 606 and/or agent 610), and when the progress is not satisfactory, additional processing machines (or "worker machines") can be added to the group working on the ML task, the number and/or type of which may optionally be selected based on characteristics of the current worker(s) that work on the task. This process can be performed repeatedly, for example, until a satisfactory rate is achieved.

As introduced above, for example, a newly added compute instance 402A-1 can be provisioned a container 618 with code (indicating logic for how to perform sub-tasks of the ML job), pick up data to be processed, and upon completion of the sub-task, update the job state 604A with the parameter server 602 (e.g., modify a first value by 0.1, etc.)

The parameter server 1002 may be implemented somewhat analogously to an in-memory database, and each worker machine may check data into and out of the database. Each worker machine may work on separate data elements; however, the work can be divided in different ways depending on the particular algorithm.

An example system includes a ML job monitor 606 that monitors the progress of an ML job. The ML job could be, for example, a job in which the job state 604A data is split into many small files or chunks (as one simple example). Thus, the ML job monitor 606 can see that a first worker machine picked up a first chunk at a first time, and updated the state at a second time. From this, the ML job monitor 606 can derive the speed/progress of the job, how long it may take, etc. Thus, the ML job monitor 606 (via agent 610) can at (7A) cause worker machines to be added or removed from the job, and/or in some embodiments a user may submit a request at (7B) to add or remove particular worker machines from the job.

Figure 7:
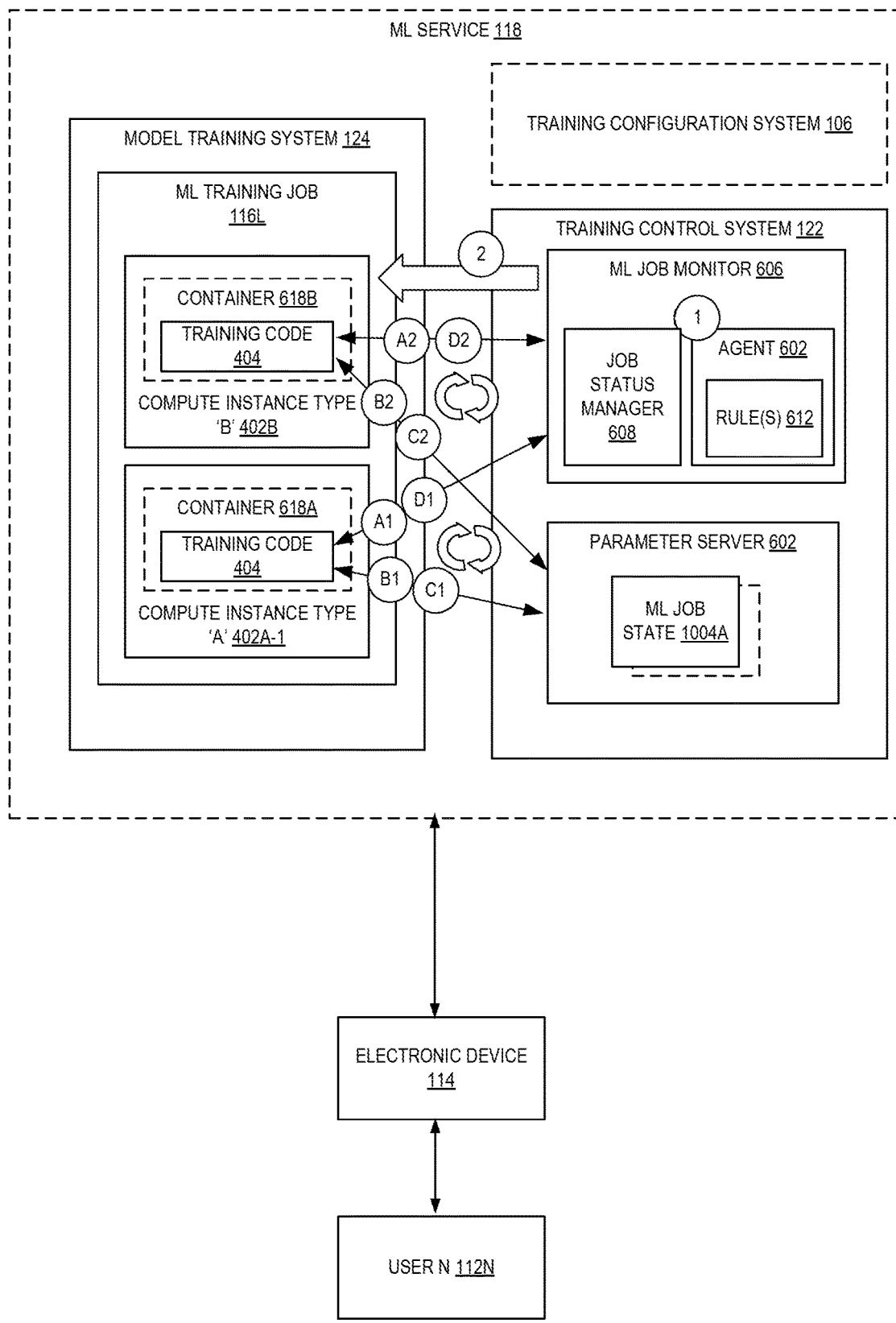
FIG. 7 is a diagram illustrating dynamic compute instance addition for a scalable machine learning training job according to some embodiments.

Turning to FIG. 7, when scaling condition is satisfied at (1) (or upon a request from a user) and a new worker machine is added for a task at (2), the worker machine can check in with the ML job monitor 606 at (A2) to determine what the worker machine is to do. In response, the ML job monitor 606 can identify what data has not yet been processed yet and tell the worker machine what chunk of the ML job it is to operate upon, mark that chunk as being currently worked on, tell the worker machine what parameter server 602 it is to work with, and which container includes the logic that is needed to perform its work.

The worker machine 615 may then spin up the needed type of compute instance, acquire and launch the proper container 618 with code 404, and at (B2) check in with the parameter server 602 to get the latest version of the state (to know what to update on), and obtain any needed data the code 404 needs to perform its work. The training code 404 may perform the necessary computations, and the code can thereafter update the parameter server with the updated state at (C2) and mark that chunk of the job as being done via a message to ML job monitor 606 at (D2). At this point, the operations for circles (A2)-(D2)—and the corresponding circles (A1)-(D1) for the other worker compute instance 402A-1—may be repeated one or more times while the job remains unfinished.

Similarly, machines can be removed from a job. At the completion of a chunk of a job, upon a worker machine checking back in with the ML job monitor 606 (e.g., to mark a chunk as complete and to obtain another task), the ML job monitor 606 can refuse to issue the worker machine new work, and optionally indicate to the machine that it is to terminate.

Figure 8:
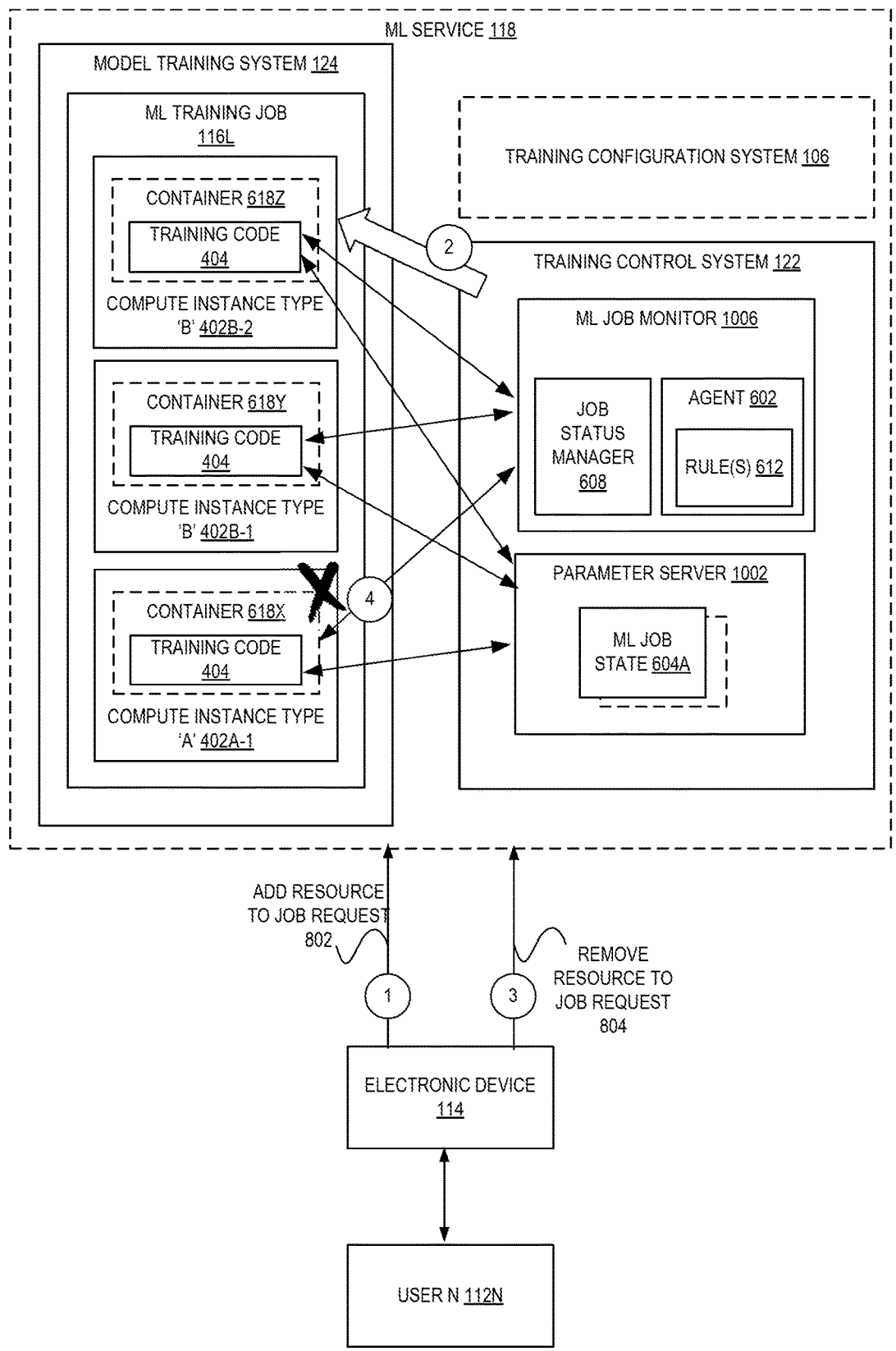
FIG. 8 is a diagram illustrating dynamic compute instance removal for a scalable machine learning training job according to some embodiments.

In some embodiments, users can use an API to control the addition/removal of machines to a job. FIG. 8 is a diagram illustrating dynamic compute instance removal for a scalable machine learning training job according to some embodiments. As shown, a user 112N may issue a request 802 (via electronic device 114) at (1) to add a particular type of worker machine to a job, which may indicate a compute instance type, a ML training job identifier, etc. In response, at (2), the training control system 122 can cause a compute instance 402B-2 to be added to the ML training job 116L as described above.

As another example, a user 112N may issue a request 804 (via electronic device 114) at (3) remove add a particular worker machine from an ongoing job. The request 804 may include an identifier of a particular compute instance to be removed, or may be general and specify information such as a type of compute instance to be removed, or just that any compute instance is to be removed. In response, at (4), upon the involved compute instance 402A-1 completing a unit of work and seeking a new allotment of work from the job status manager 608, the job status manager 608 can refuse to issue a new allotment, and send a message that causes the compute instance 402A-1 to be terminated.

Figure 9:
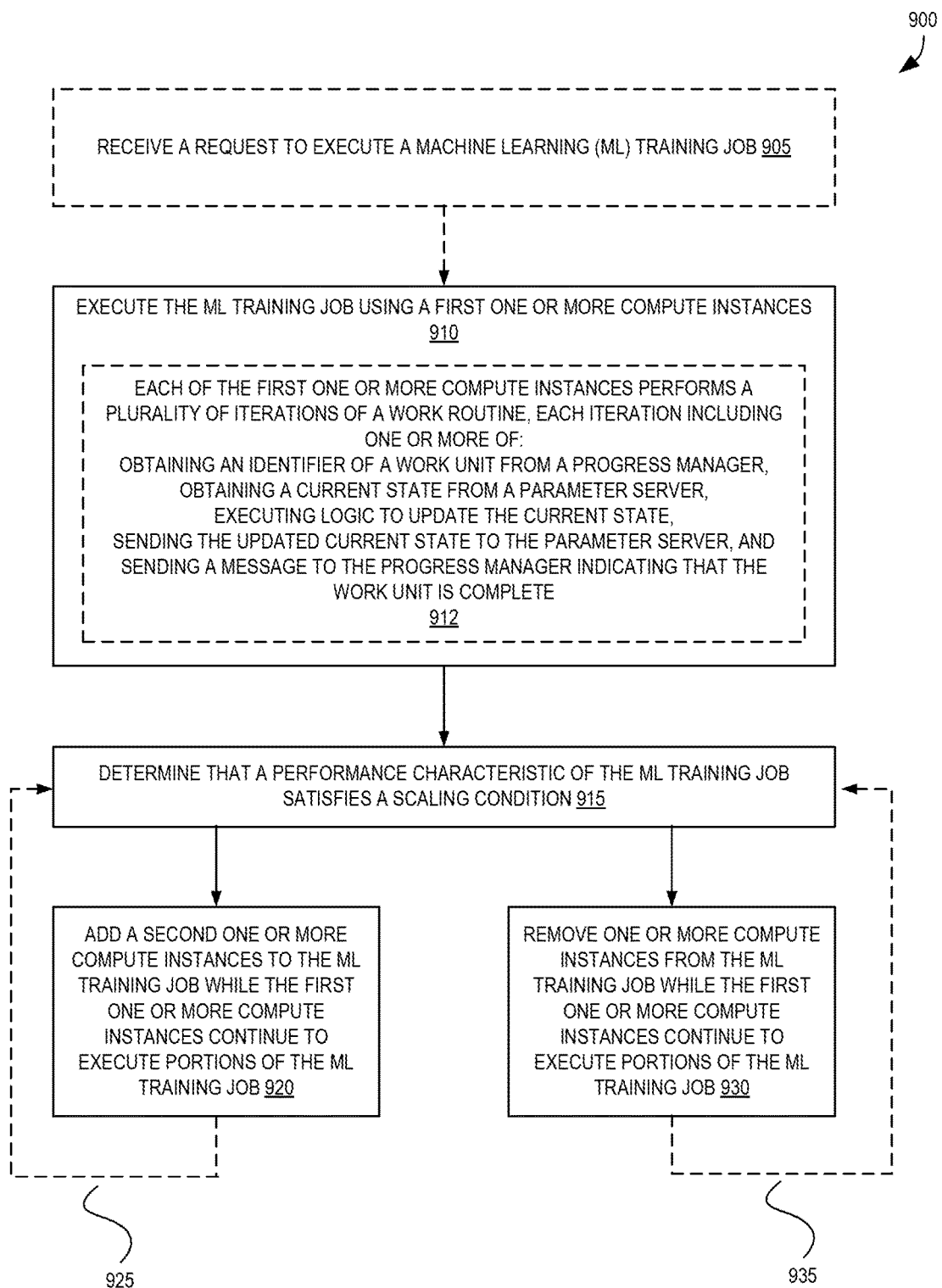
FIG. 9 is a flow diagram illustrating operations (e.g., of a method) for scalable machine learning training jobs according to some embodiments.

FIG. 9 is a flow diagram illustrating operations 900 (e.g., of a method) for scalable machine learning training jobs according to some embodiments. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 900 are performed by the training control system 122 and/or model training system 124 of the other figures.

The operations 900 optionally include, at block 905, receiving a request to execute a machine learning (ML) training job 905. The request may identify training code, a container including training code, etc. The request may identify one or more compute instance types and an amount of compute instances to use to run the ML training job.

At block 910, the operations 900 include causing the ML training job to be executed using a first one or more compute instances (e.g., of a type indicated by the request of block 905). Block 910 may include sending one or more messages to a model training system 124 to launch one or more compute instances, load containers, etc.

Optionally, at block 912, as part of the execution, each of the first one or more compute instances performs a plurality of iterations of a work routine, each iteration including one or more of: obtaining an identifier of a work unit from a progress manager, obtaining a current state from a parameter server, executing logic to update the current state, sending the updated current state to the parameter server, and sending a message to the progress manager indicating that the work unit is complete.

At block 915, the operations 900 include determining that a performance characteristic of the ML training job satisfies a scaling condition. Block 915 can include measuring the performance characteristic of the ML training job (e.g., determining a predicated training time or completion time, determining a progress/learning rate, etc.), and determining whether the performance characteristic's value (or a value derived therefrom, such as a predicted time of completion) meets or exceeds (or another comparison for) a threshold value specified by the rule. The scaling condition may be identified by a rule, which may have been configured by a user. The rule may indicate whether, when the scaling condition is satisfied, worker instances are to be added or removed.

If a worker instance is to be added, at block 920, the operations 900 include adding a second one or more compute instances to the ML training job while the first one or more compute instances continue to execute portions of the ML training job. The flow may continue back via arrow 925 to block 915 for further monitoring.

If a worker instance is to be removed, at block 930, the operations 900 include removing one or more compute instances from the ML training job while the first one or more compute instances continue to execute portions of the ML training job. The flow may continue back via arrow 935 to block 915 for further monitoring.

Figure 10:
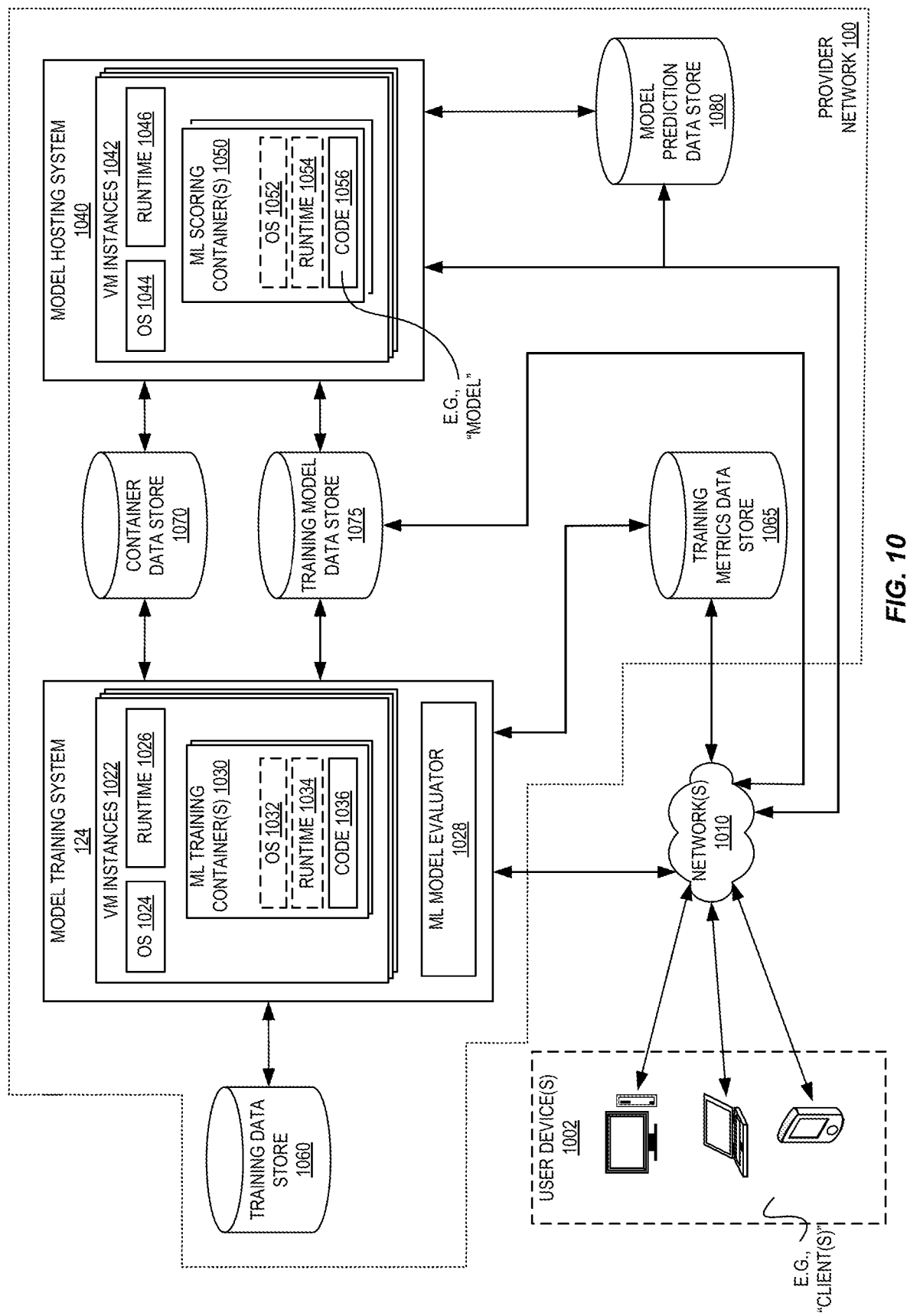
FIG. 10 is a block diagram of an illustrative operating environment in which machine learning models are trained and hosted according to some embodiments.

For further detail regarding ML training jobs and the use of containers,

FIG. 10 is a block diagram of an illustrative operating environment in which machine learning models are trained and hosted according to some embodiments. The operating environment includes end user devices 1002, a model training system 124, a model hosting system 1040, a training data store 1060, a training metrics data store 1065, a container data store 1070, a training model data store 1075, and a model prediction data store 1080.

The machine learning service 140 described herein may include one or more of these entities, such as the model hosting system 1040, model training system 124, etc. For example, in some embodiments the ML models described herein may be run by model hosting system 1040.

In some embodiments, users, by way of user devices 1002, interact with the model training system 124 to provide data that causes the model training system 124 to train one or more machine learning models. A machine learning model, generally, may be thought of as one or more equations that are "trained" using a set of data. In some embodiments, the model training system 124 provides ML functionalities as a Web service, and thus messaging between user devices 1002 and the model training system 124 (or provider network 100), and/or between components of the model training system 124 (or provider network 100), may utilize HTTP messages to transfer data in a machine-readable file format, such as extensible Markup Language (XML) or JavaScript Object Notation (JSON).

The user devices 1002 can interact with the model training system 124 via frontend 1029 of the model training system 124. For example, a user device 1002 can provide a training request to the frontend 1029 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 1002, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 1002 may provide, in the training request, an algorithm written in any programming language. The model training system 124 then packages the algorithm into a container (optionally with other code, such as a "base" ML algorithm supplemented with user-provided code) that is eventually loaded into a virtual machine instance 1022 for training a machine learning model, as described in greater detail below. For example, a user, via a user device 1002, may develop an algorithm/code using an application (e.g., an interactive web-based programming environment) and cause the algorithm/code to be provided—perhaps as part of a training request (or referenced in a training request)—to the model training system 124, where this algorithm/code may be containerized on its own or used together with an existing container having a machine learning framework, for example.

In some embodiments, instead of providing a container image in the training request, the user device 1002 provides, in the training request, an indicator of a container image (e.g., an indication of an address or a location at which a container image is stored). For example, the container image can be stored in a container data store 1070, and this container image may have been previously created/uploaded by the user. The model training system 124 can retrieve the container image from the indicated location and create a container using the retrieved container image. The container is then loaded into a virtual machine instance 1022 for training a machine learning model, as described in greater detail below.

The model training system 124 can use the information provided by the user device 1002 to train a machine learning model in one or more pre-established virtual machine instances 1022 in some embodiments. In particular, the model training system 124 includes a single physical computing device or multiple physical computing devices that are interconnected using one or more computing networks (not shown), where the physical computing device(s) host one or more virtual machine instances 1022. The model training system 124 can handle the acquisition and configuration of compute capacity (e.g., containers, instances, etc., which are described in greater detail below) based on the information describing the computing machine on which to train a machine learning model provided by the user device 1002. The model training system 124 can then train machine learning models using the compute capacity, as is described in greater detail below. The model training system 124 can automatically scale up and down based on the volume of training requests received from user devices 1002 via frontend 1029, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 1022 are utilized to execute tasks. For example, such tasks can include training a machine learning model. As shown in FIG. 10, each virtual machine instance 1022 includes an operating system (OS) 1024, a language runtime 1026, and one or more ML training containers 1030. Generally, the ML training containers 1030 are logical units created within a virtual machine instance using the resources available on that instance, and can be utilized to isolate execution of a task from other processes (e.g., task executions) occurring in the instance. In some embodiments, the ML training containers 1030 are formed from one or more container images and a top container layer. Each container image may further include one or more image layers, where each image layer represents an executable instruction. As described above, some or all of the executable instructions together represent an algorithm that defines a machine learning model. Changes made to the ML training containers 1030 (e.g., creation of new files, modification of existing files, deletion of files, etc.) are stored in the top container layer. If a ML training container 1030 is deleted, the top container layer is also deleted. However, the container image(s) that form a portion of the deleted ML training container 1030 can remain unchanged. The ML training containers 1030 can be implemented, for example, as Linux containers (LXC), Docker containers, and the like.

The ML training containers 1030 may include individual copies of an OS 1032 (e.g., portions of an OS, while OS kernel code may not be included within a container but instead be "shared" amongst containers), runtime 1034, and code 1036 in some embodiments. The OS 1032 and/or the runtime 1034 can be defined by one or more executable instructions that form at least a portion of a container image that is used to form the ML training container 1030 (e.g., the executable instruction(s) in the container image that define the operating system and/or runtime to run in the container formed from the container image). The code 1036 includes one or more executable instructions that form at least a portion of a container image that is used to form the ML training container 1030. For example, the code 1036 includes the executable instructions in the container image that represent an algorithm that defines a machine learning model. The OS 1032 and/or runtime 1034 are configured to execute the code 1036 in response to an instruction to begin machine learning model training. Execution of the code 1036 results in the generation of model data, as described in greater detail below.

In some embodiments, the code 1036 includes executable instructions that represent algorithms that define different machine learning models. For example, the code 1036 includes one set of executable instructions that represent a first algorithm that defines a first machine learning model and a second set of executable instructions that represent a second algorithm that defines a second machine learning model. In some embodiments, the virtual machine instance 1022 executes the code 1036 and trains all of the machine learning models. In some embodiments, the virtual machine instance 1022 executes the code 1036, selecting one of the machine learning models to train. For example, the virtual machine instance 1022 can identify a type of training data indicated by the training request and select a machine learning model to train (e.g., execute the executable instructions that represent an algorithm that defines the selected machine learning model) that corresponds with the identified type of training data.

In some embodiments, the OS 1032 and the runtime 1034 are the same as the OS 1024 and runtime 1026 utilized by the virtual machine instance 1022. In some embodiments, the OS 1032 and/or the runtime 1034 are different than the OS 1024 and/or runtime 1026 utilized by the virtual machine instance 1022.

In some embodiments, the model training system 124 uses one or more container images included in a training request (or a container image retrieved from the container data store 1070 in response to a received training request) to create and initialize a ML training container 1030 in a virtual machine instance 1022. For example, the model training system 124 creates a ML training container 1030 that includes the container image(s) and/or a top container layer.

Prior to beginning the training process, in some embodiments, the model training system 124 retrieves training data from the location indicated in the training request. For example, the location indicated in the training request can be a location in the training data store 1060. Thus, the model training system 124 retrieves the training data from the indicated location in the training data store 1060. In some embodiments, the model training system 124 does not retrieve the training data prior to beginning the training process. Rather, the model training system 124 streams the training data from the indicated location during the training process. For example, the model training system 124 can initially retrieve a portion of the training data and provide the retrieved portion to the virtual machine instance 1022 training the machine learning model. Once the virtual machine instance 1022 has applied and used the retrieved portion or once the virtual machine instance 1022 is about to use all of the retrieved portion (e.g., a buffer storing the retrieved portion is nearly empty), then the model training system 124 can retrieve a second portion of the training data and provide the second retrieved portion to the virtual machine instance 1022, and so on.

To perform the machine learning model training, the virtual machine instance 1022 executes code 1036 stored in the ML training container 1030 in some embodiments. For example, the code 1036 includes some or all of the executable instructions that form the container image of the ML training container 1030 initialized therein. Thus, the virtual machine instance 1022 executes some or all of the executable instructions that form the container image of the ML training container 1030 initialized therein to train a machine learning model. The virtual machine instance 1022 executes some or all of the executable instructions according to the hyperparameter values included in the training request. As an illustrative example, the virtual machine instance 1022 trains a machine learning model by identifying values for certain parameters (e.g., coefficients, weights, centroids, etc.). The identified values depend on hyperparameters that define how the training is performed. Thus, the virtual machine instance 1022 can execute the executable instructions to initiate a machine learning model training process, where the training process is run using the hyperparameter values included in the training request. Execution of the executable instructions can include the virtual machine instance 1022 applying the training data retrieved by the model training system 124 as input parameters to some or all of the instructions being executed.

In some embodiments, executing the executable instructions causes the virtual machine instance 1022 (e.g., the ML training container 1030) to generate model data. For example, the ML training container 1030 generates model data and stores the model data in a file system of the ML training container 1030. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 1030 such that the model data is written to the top container layer of the ML training container 1030 and/or the container image(s) that forms a portion of the ML training container 1030 is modified to include the model data.

The virtual machine instance 1022 (or the model training system 124 itself) pulls the generated model data from the ML training container 1030 and stores the generated model data in the training model data store 1075 in an entry associated with the virtual machine instance 1022 and/or the machine learning model being trained. In some embodiments, the virtual machine instance 1022 generates a single file that includes model data and stores the single file in the training model data store 1075. In some embodiments, the virtual machine instance 1022 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 1022 can package the multiple files into a single file once training is complete and store the single file in the training model data store 1075. Alternatively, the virtual machine instance 1022 stores the multiple files in the training model data store 1075. The virtual machine instance 1022 stores the file(s) in the training model data store 1075 while the training process is ongoing and/or after the training process is complete.

In some embodiments, the virtual machine instance 1022 regularly stores model data file(s) in the training model data store 1075 as the training process is ongoing. Thus, model data file(s) can be stored in the training model data store 1075 at different times during the training process. Each set of model data files corresponding to a particular time or each set of model data files present in the training model data store 1075 as of a particular time could be checkpoints that represent different versions of a partially-trained machine learning model during different stages of the training process. Accordingly, before training is complete, a user, via the user device 1002 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 1075.

In some embodiments, a virtual machine instance 1022 executes code 1036 stored in a plurality of ML training containers 1030. For example, the algorithm included in the container image can be in a format that allows for the parallelization of the training process. Thus, the model training system 124 can create multiple copies of the container image provided in a training request and cause the virtual machine instance 1022 to load each container image copy in a separate ML training container 1030. The virtual machine instance 1022 can then execute, in parallel, the code 1036 stored in the ML training containers 1030. The virtual machine instance 1022 can further provide configuration information to each ML training container 1030 (e.g., information indicating that N ML training containers 1030 are collectively training a machine learning model and that a particular ML training container 1030 receiving the configuration information is ML training container 1030 number X of N), which can be included in the resulting model data. By parallelizing the training process, the model training system 124 can significantly reduce the training time in some embodiments.

In some embodiments, a plurality of virtual machine instances 1022 execute code 1036 stored in a plurality of ML training containers 1030. For example, the resources used to train a particular machine learning model can exceed the limitations of a single virtual machine instance 1022. However, the algorithm included in the container image can be in a format that allows for the parallelization of the training process. Thus, the model training system 124 can create multiple copies of the container image provided in a training request, initialize multiple virtual machine instances 1022, and cause each virtual machine instance 1022 to load a container image copy in one or more separate ML training containers 1030. The virtual machine instances 1022 can then each execute the code 1036 stored in the ML training containers 1030 in parallel. The model training system 124 can further provide configuration information to each ML training container 1030 via the virtual machine instances 1022 (e.g., information indicating that N ML training containers 1030 are collectively training a machine learning model and that a particular ML training container 1030 receiving the configuration information is ML training container 1030 number X of N, information indicating that M virtual machine instances 1022 are collectively training a machine learning model and that a particular ML training container 1030 receiving the configuration information is initialized in virtual machine instance 1022 number Y of M, etc.), which can be included in the resulting model data. As described above, by parallelizing the training process, the model training system 124 can significantly reduce the training time in some embodiments.

In some embodiments, the model training system 124 includes a plurality of physical computing devices and two or more of the physical computing devices hosts one or more virtual machine instances 1022 that execute the code 1036. Thus, the parallelization can occur over different physical computing devices in addition to over different virtual machine instances 1022 and/or ML training containers 1030.

In some embodiments, the model training system 124 includes a ML model evaluator 1028. The ML model evaluator 1028 can monitor virtual machine instances 1022 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 1028 can obtain the model data for a machine learning model being trained and evaluation data from the training data store 1060. The evaluation data is separate from the data used to train a machine learning model and includes both input data and expected outputs (e.g., known results), and thus the ML model evaluator 1028 can define a machine learning model using the model data and execute the machine learning model by providing the input data as inputs to the machine learning model. The ML model evaluator 1028 can then compare the outputs of the machine learning model to the expected outputs, and determine one or more quality metrics of the machine learning model being trained based on the comparison (e.g., the error rate can be a difference or distance between the machine learning model outputs and the expected outputs).

The ML model evaluator 1028 periodically generates model metrics during the training process and stores the model metrics in the training metrics data store 1065 in some embodiments. While the machine learning model is being trained, a user, via the user device 1002, can access and retrieve the model metrics from the training metrics data store 1065. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 1002, can transmit a request to the model training system 124 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 124 can modify the machine learning model accordingly. For example, the model training system 124 can cause the virtual machine instance 1022 to optionally delete an existing ML training container 1030, create and initialize a new ML training container 1030 using some or all of the information included in the request, and execute the code 1036 stored in the new ML training container 1030 to restart the machine learning model training process. As another example, the model training system 124 can cause the virtual machine instance 1022 to modify the execution of code stored in an existing ML training container 1030 according to the data provided in the modification request. In some embodiments, the user, via the user device 1002, can transmit a request to the model training system 124 to stop the machine learning model training process. The model training system 124 can then instruct the virtual machine instance 1022 to delete the ML training container 1030 and/or to delete any model data stored in the training model data store 1075.

As described below, in some embodiments, the model data stored in the training model data store 1075 is used by the model hosting system 1040 to deploy machine learning models. Alternatively or in addition, a user device 1002 or another computing device (not shown) can retrieve the model data from the training model data store 1075 to implement a learning algorithm in an external device. As an illustrative example, a robotic device can include sensors to capture input data. A user device 1002 can retrieve the model data from the training model data store 1075 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 1022 are shown in FIG. 10 as a single grouping of virtual machine instances 1022, some embodiments of the present application separate virtual machine instances 1022 that are actively assigned to execute tasks from those virtual machine instances 1022 that are not actively assigned to execute tasks. For example, those virtual machine instances 1022 actively assigned to execute tasks are grouped into an "active pool," while those virtual machine instances 1022 not actively assigned to execute tasks are placed within a "warming pool." In some embodiments, those virtual machine instances 1022 within the warming pool can be pre-initialized with an operating system, language runtimes, and/or other software required to enable rapid execution of tasks (e.g., rapid initialization of machine learning model training in ML training container(s) 1030) in response to training requests.

In some embodiments, the model training system 124 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 1002, the model hosting system 1040, etc.). The processing unit can also communicate to and from a memory of a virtual machine instance 1022 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 1040 includes a single physical computing device or multiple physical computing devices that are interconnected using one or more computing networks (not shown), where the physical computing device(s) host one or more virtual machine instances 1042. The model hosting system 1040 can handle the acquisition and configuration of compute capacity (e.g., containers, instances, etc.) based on demand for the execution of trained machine learning models. The model hosting system 1040 can then execute machine learning models using the compute capacity, as is described in greater detail below. The model hosting system 1040 can automatically scale up and down based on the volume of execution requests received from user devices 1002 via frontend 1049 of the model hosting system 1040, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 1042 are utilized to execute tasks. For example, such tasks can include executing a machine learning model. As shown in FIG. 10, each virtual machine instance 1042 includes an operating system (OS) 1044, a language runtime 1046, and one or more ML scoring containers 1050. The ML scoring containers 1050 are similar to the ML training containers 1030 in that the ML scoring containers 1050 are logical units created within a virtual machine instance using the resources available on that instance, and can be utilized to isolate execution of a task from other processes (e.g., task executions) occurring in the instance. In some embodiments, the ML scoring containers 1050 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 1050 (e.g., creation of new files, modification of existing files, deletion of files, etc.) are stored in the top container layer. If a ML scoring container 1050 is deleted, the top container layer is also deleted. However, the container image(s) that form a portion of the deleted ML scoring container 1050 can remain unchanged. The ML scoring containers 1050 can be implemented, for example, as Linux containers.

The ML scoring containers 1050 each include individual copies of an OS 1052, runtime 1054, and code 1056 in some embodiments. The OS 1052 and/or the runtime 1054 can be defined by one or more executable instructions that form at least a portion of a container image that is used to form the ML scoring container 1050 (e.g., the executable instruction(s) in the container image that define the operating system and/or runtime to run in the container formed from the container image). The code 1056 includes one or more executable instructions that form at least a portion of a container image that is used to form the ML scoring container 1050. For example, the code 1056 includes the executable instructions in the container image that represent an algorithm that defines a machine learning model. The code 1056 can also include model data that represent characteristics of the defined machine learning model, as described in greater detail below. The OS 1052 and/or runtime 1054 are configured to execute the code 1056 in response to an instruction to begin execution of a machine learning model. Execution of the code 1056 results in the generation of outputs (e.g., predicted results), as described in greater detail below.

In some embodiments, the OS 1052 and the runtime 1054 are the same as the OS 1044 and runtime 1046 utilized by the virtual machine instance 1042. In some embodiments, the OS 1052 and/or the runtime 1054 are different than the OS 1044 and/or runtime 1046 utilized by the virtual machine instance 1042.

In some embodiments, the model hosting system 1040 uses one or more container images included in a deployment request (or a container image retrieved from the container data store 1070 in response to a received deployment request) to create and initialize a ML scoring container 1050 in a virtual machine instance 1042. For example, the model hosting system 1040 creates a ML scoring container 1050 that includes the container image(s) and/or a top container layer.

As described above, a user device 1002 can submit a deployment request and/or an execution request to the model hosting system 1040 via the frontend 1049 in some embodiments. A deployment request causes the model hosting system 1040 to deploy a trained machine learning model into a virtual machine instance 1042. For example, the deployment request can include an identification of an endpoint (e.g., an endpoint name, such as an HTTP endpoint name) and an identification of one or more trained machine learning models (e.g., a location of one or more model data files stored in the training model data store 1075). Optionally, the deployment request also includes an identification of one or more container images stored in the container data store 1070.

Upon receiving the deployment request, the model hosting system 1040 initializes ones or more ML scoring containers 1050 in one or more hosted virtual machine instance 1042. In embodiments in which the deployment request includes an identification of one or more container images, the model hosting system 1040 forms the ML scoring container(s) 1050 from the identified container image(s). For example, a container image identified in a deployment request can be the same container image used to form an ML training container 1030 used to train the machine learning model corresponding to the deployment request. Thus, the code 1056 of the ML scoring container(s) 1050 includes one or more executable instructions in the container image(s) that represent an algorithm that defines a machine learning model. In embodiments in which the deployment request does not include an identification of a container image, the model hosting system 1040 forms the ML scoring container(s) 1050 from one or more container images stored in the container data store 1070 that are appropriate for executing the identified trained machine learning model(s). For example, an appropriate container image can be a container image that includes executable instructions that represent an algorithm that defines the identified trained machine learning model(s).

The model hosting system 1040 further forms the ML scoring container(s) 1050 by retrieving model data corresponding to the identified trained machine learning model(s) in some embodiments. For example, the deployment request can identify a location of model data file(s) stored in the training model data store 1075. In embodiments in which a single model data file is identified in the deployment request, the model hosting system 1040 retrieves the identified model data file from the training model data store 1075 and inserts the model data file into a single ML scoring container 1050, which forms a portion of code 1056. In some embodiments, the model data file is archived or compressed (e.g., formed from a package of individual files). Thus, the model hosting system 1040 unarchives or decompresses the model data file to obtain multiple individual files, and inserts the individual files into the ML scoring container 1050. In some embodiments, the model hosting system 1040 stores the model data file in the same location as the location in which the model data file was stored in the ML training container 1030 that generated the model data file. For example, the model data file initially was stored in the top container layer of the ML training container 1030 at a certain offset, and the model hosting system 1040 then stores the model data file in the top container layer of the ML scoring container 1050 at the same offset.

In embodiments in which multiple model data files are identified in the deployment request, the model hosting system 1040 retrieves the identified model data files from the training model data store 1075. The model hosting system 1040 can insert the model data files into the same ML scoring container 1050, into different ML scoring containers 1050 initialized in the same virtual machine instance 1042, or into different ML scoring containers 1050 initialized in different virtual machine instances 1042. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 1040 associates the initialized ML scoring container(s) 1050 with the endpoint identified in the deployment request. For example, each of the initialized ML scoring container(s) 1050 can be associated with a network address. The model hosting system 1040 can map the network address(es) to the identified endpoint, and the model hosting system 1040 or another system (e.g., a routing system, not shown) can store the mapping. Thus, a user device 1002 can refer to trained machine learning model(s) stored in the ML scoring container(s) 1050 using the endpoint. This allows for the network address of an ML scoring container 1050 to change without causing the user operating the user device 1002 to change the way in which the user refers to a trained machine learning model.

Once the ML scoring container(s) 1050 are initialized, the ML scoring container(s) 1050 are ready to execute trained machine learning model(s). In some embodiments, the user device 1002 transmits an execution request to the model hosting system 1040 via the frontend 1049, where the execution request identifies an endpoint and includes an input to a machine learning model (e.g., a set of input data). The model hosting system 1040 or another system (e.g., a routing system, not shown) can obtain the execution request, identify the ML scoring container(s) 1050 corresponding to the identified endpoint, and route the input to the identified ML scoring container(s) 1050.

In some embodiments, a virtual machine instance 1042 executes the code 1056 stored in an identified ML scoring container 1050 in response to the model hosting system 1040 receiving the execution request. In particular, execution of the code 1056 causes the executable instructions in the code 1056 corresponding to the algorithm to read the model data file stored in the ML scoring container 1050, use the input included in the execution request as an input parameter, and generate a corresponding output. As an illustrative example, the algorithm can include coefficients, weights, layers, cluster centroids, and/or the like. The executable instructions in the code 1056 corresponding to the algorithm can read the model data file to determine values for the coefficients, weights, layers, cluster centroids, and/or the like. The executable instructions can include input parameters, and the input included in the execution request can be supplied by the virtual machine instance 1042 as the input parameters. With the machine learning model characteristics and the input parameters provided, execution of the executable instructions by the virtual machine instance 1042 can be completed, resulting in an output.

In some embodiments, the virtual machine instance 1042 stores the output in the model prediction data store 1080. Alternatively or in addition, the virtual machine instance 1042 transmits the output to the user device 1002 that submitted the execution result via the frontend 1049.

In some embodiments, the execution request corresponds to a group of related trained machine learning models. Thus, the ML scoring container 1050 can transmit the output to a second ML scoring container 1050 initialized in the same virtual machine instance 1042 or in a different virtual machine instance 1042. The virtual machine instance 1042 that initialized the second ML scoring container 1050 can then execute second code 1056 stored in the second ML scoring container 1050, providing the received output as an input parameter to the executable instructions in the second code 1056. The second ML scoring container 1050 further includes a model data file stored therein, which is read by the executable instructions in the second code 1056 to determine values for the characteristics defining the machine learning model. Execution of the second code 1056 results in a second output. The virtual machine instance 1042 that initialized the second ML scoring container 1050 can then transmit the second output to the model prediction data store 1080 and/or the user device 1002 via the frontend 1049 (e.g., if no more trained machine learning models are needed to generate an output) or transmit the second output to a third ML scoring container 1050 initialized in the same or different virtual machine instance 1042 (e.g., if outputs from one or more additional trained machine learning models are needed), and the above-referenced process can be repeated with respect to the third ML scoring container 1050.

While the virtual machine instances 1042 are shown in FIG. 10 as a single grouping of virtual machine instances 1042, some embodiments of the present application separate virtual machine instances 1042 that are actively assigned to execute tasks from those virtual machine instances 1042 that are not actively assigned to execute tasks. For example, those virtual machine instances 1042 actively assigned to execute tasks are grouped into an "active pool," while those virtual machine instances 1042 not actively assigned to execute tasks are placed within a "warming pool." In some embodiments, those virtual machine instances 1042 within the warming pool can be pre-initialized with an operating system, language runtimes, and/or other software required to enable rapid execution of tasks (e.g., rapid initialization of ML scoring container(s) 1050, rapid execution of code 1056 in ML scoring container(s), etc.) in response to deployment and/or execution requests.

In some embodiments, the model hosting system 1040 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 1002, the model training system 124, etc.). The processing unit can also communicate to and from a memory of a virtual machine instance 1042 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment 1000 supports many different types of machine learning models, such as multi arm bandit models, reinforcement learning models, ensemble machine learning models, deep learning models, and/or the like.

The model training system 124 and the model hosting system 1040 depicted in FIG. 10 are not meant to be limiting. For example, the model training system 124 and/or the model hosting system 1040 could also operate within a computing environment having a fewer or greater number of devices than are illustrated in FIG. 10. Thus, the depiction of the model training system 124 and/or the model hosting system 1040 in FIG. 10 may be taken as illustrative and not limiting to the present disclosure. For example, the model training system 124 and/or the model hosting system 1040 or various constituents thereof could implement various Web services components, hosted or "cloud" computing environments, and/or peer-to-peer network configurations to implement at least a portion of the processes described herein. In some embodiments, the model training system 124 and/or the model hosting system 1040 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 1029 processes all training requests received from user devices 1002 and provisions virtual machine instances 1022. In some embodiments, the frontend 1029 serves as a front door to all the other services provided by the model training system 124. The frontend 1029 processes the requests and makes sure that the requests are properly authorized. For example, the frontend 1029 may determine whether the user associated with the training request is authorized to initiate the training process.

Similarly, frontend 1049 processes all deployment and execution requests received from user devices 1002 and provisions virtual machine instances 1042. In some embodiments, the frontend 1049 serves as a front door to all the other services provided by the model hosting system 1040. The frontend 1049 processes the requests and makes sure that the requests are properly authorized. For example, the frontend 1049 may determine whether the user associated with a deployment request or an execution request is authorized to access the indicated model data and/or to execute the indicated machine learning model.

The training data store 1060 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 1060 is depicted as being located external to the model training system 124 and the model hosting system 1040, this is not meant to be limiting. For example, in some embodiments not shown, the training data store 1060 is located internal to at least one of the model training system 124 or the model hosting system 1040.

In some embodiments, the training metrics data store 1065 stores model metrics. While the training metrics data store 1065 is depicted as being located external to the model training system 124 and the model hosting system 1040, this is not meant to be limiting. For example, in some embodiments not shown, the training metrics data store 1065 is located internal to at least one of the model training system 124 or the model hosting system 1040.

The container data store 1070 stores container images, such as container images used to form ML training containers 1030 and/or ML scoring containers 1050, that can be retrieved by various virtual machine instances 1022 and/or 1042. While the container data store 1070 is depicted as being located external to the model training system 124 and the model hosting system 1040, this is not meant to be limiting. For example, in some embodiments not shown, the container data store 1070 is located internal to at least one of the model training system 124 and the model hosting system 1040.

The training model data store 1075 stores model data files. In some embodiments, some of the model data files are comprised of a single file, while other model data files are packages of multiple individual files. While the training model data store 1075 is depicted as being located external to the model training system 124 and the model hosting system 1040, this is not meant to be limiting. For example, in some embodiments not shown, the training model data store 1075 is located internal to at least one of the model training system 124 or the model hosting system 1040.

The model prediction data store 1080 stores outputs (e.g., execution results) generated by the ML scoring containers 1050 in some embodiments. While the model prediction data store 1080 is depicted as being located external to the model training system 124 and the model hosting system 1040, this is not meant to be limiting. For example, in some embodiments not shown, the model prediction data store 1080 is located internal to at least one of the model training system 124 and the model hosting system 1040.

While the model training system 124, the model hosting system 1040, the training data store 1060, the training metrics data store 1065, the container data store 1070, the training model data store 1075, and the model prediction data store 1080 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 1002 via the network 1010.

Various example user devices 1002 are shown in FIG. 10, including a desktop computer, laptop, and a mobile phone, each provided by way of illustration. In general, the user devices 1002 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 124 and/or the model hosting system 1040 provides the user devices 1002 with one or more user interfaces, command-line interfaces (CLI), application programing interfaces (API), and/or other programmatic interfaces for submitting training requests, deployment requests, and/or execution requests. In some embodiments, the user devices 1002 can execute a stand-alone application that interacts with the model training system 124 and/or the model hosting system 1040 for submitting training requests, deployment requests, and/or execution requests.

In some embodiments, the network 1010 includes any wired network, wireless network, or combination thereof. For example, the network 1010 may be a personal area network, local area network, wide area network, over-the-air broadcast network (e.g., for radio or television), cable network, satellite network, cellular telephone network, or combination thereof. As a further example, the network 1010 may be a publicly accessible network of linked networks, possibly operated by various distinct parties, such as the Internet. In some embodiments, the network 1010 may be a private or semi-private network, such as a corporate or university intranet. The network 1010 may include one or more wireless networks, such as a Global System for Mobile Communications (GSM) network, a Code Division Multiple Access (CDMA) network, a Long Term Evolution (LTE) network, or any other type of wireless network. The network 1010 can use protocols and components for communicating via the Internet or any of the other aforementioned types of networks. For example, the protocols used by the network 1010 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 11:
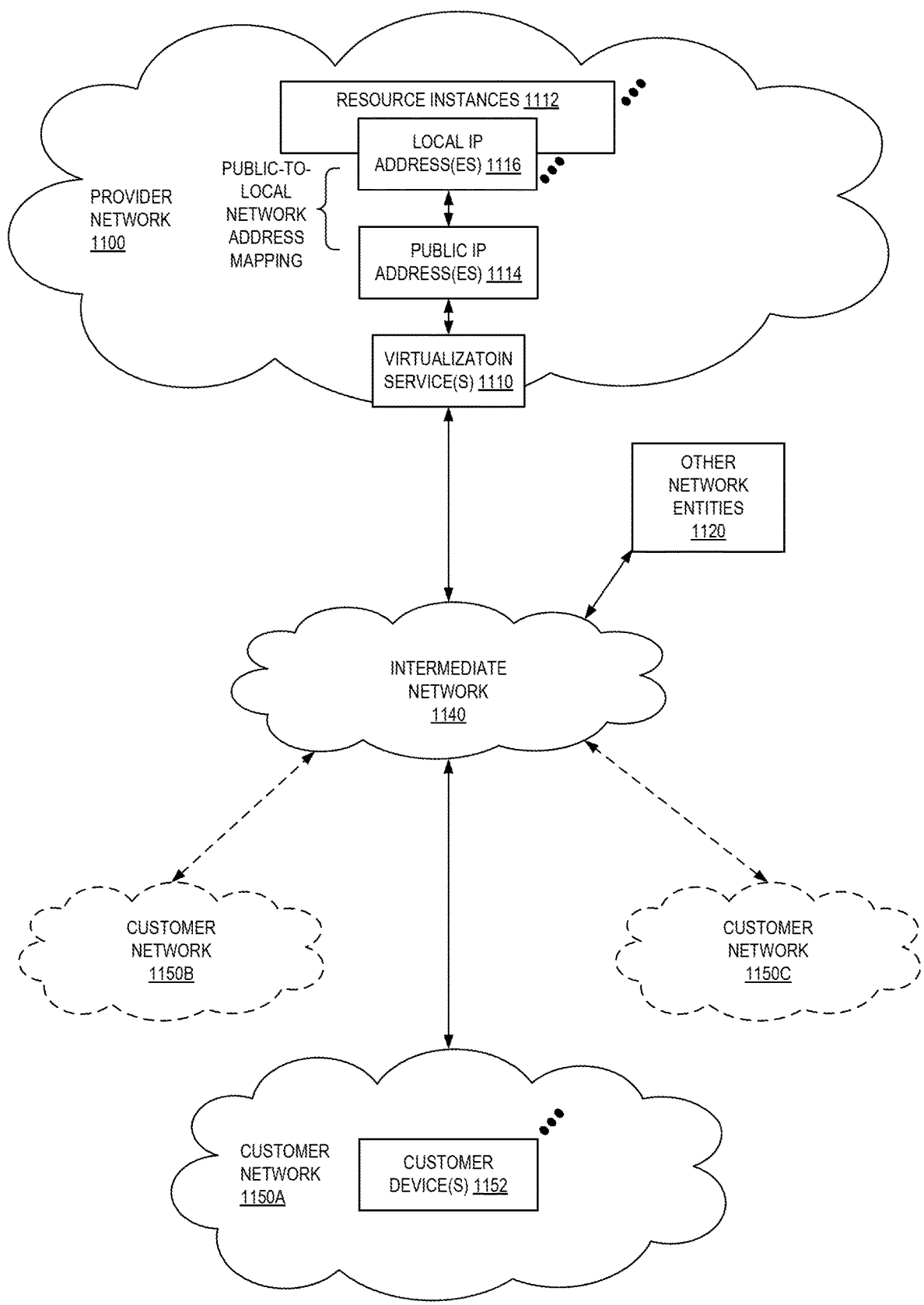
FIG. 11 illustrates an example provider network environment according to some embodiments.

FIG. 11 illustrates an example provider network (or "service provider system") environment according to some embodiments. A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local IP addresses 1116 may be associated with the resource instances 1112; the local IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more client networks 1150A-1150C including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses. Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
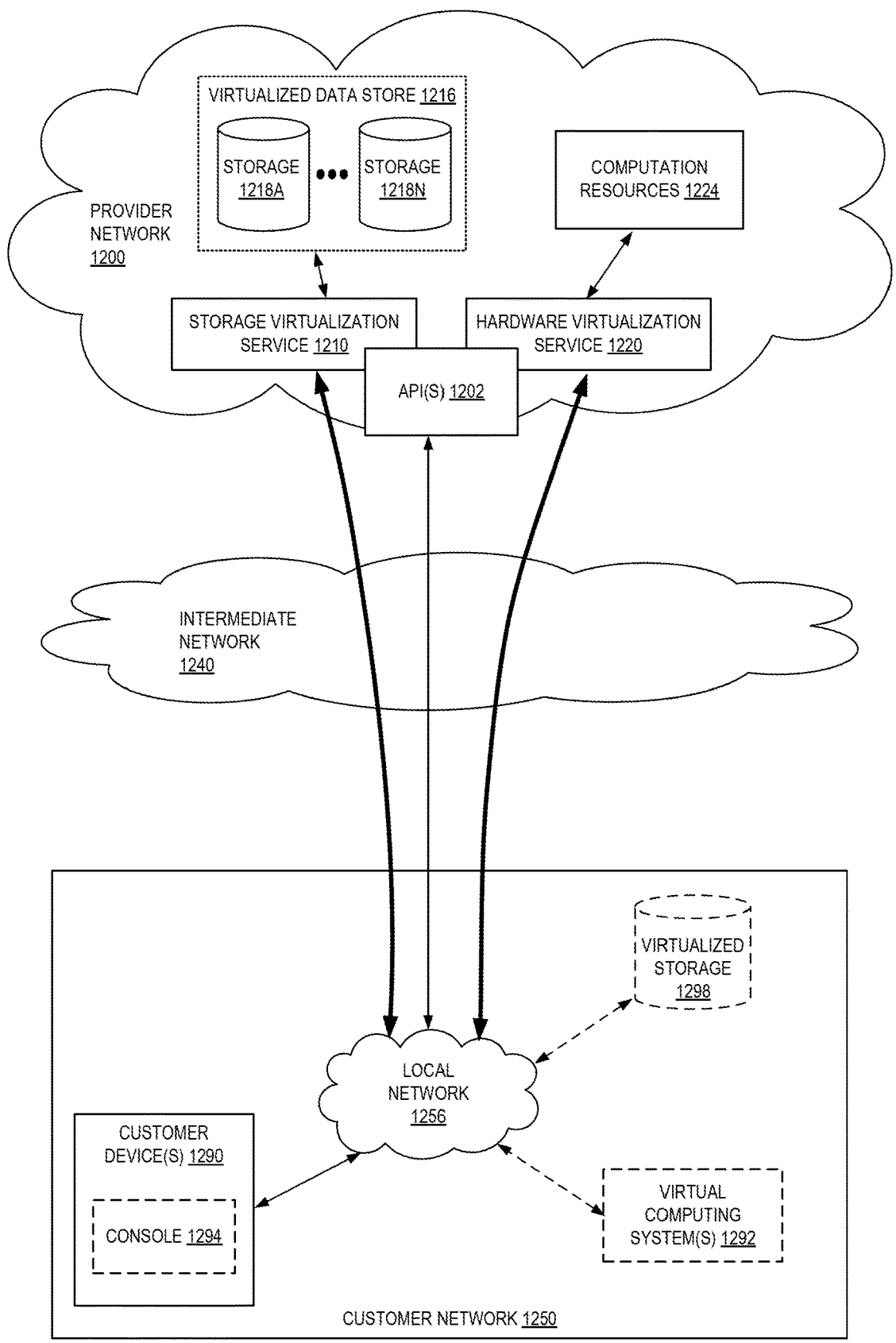
FIG. 12 is a block diagram of an example provider network that provides a storage virtualization service and a hardware virtualization service to customers according to some embodiments.

FIG. 12 is a block diagram of an example provider network that provides a storage virtualization service and a hardware virtualization service to customers, according to some embodiments. Hardware virtualization service 1220 provides multiple computation resources 1224 (e.g., VMs) to customers. The computation resources 1224 may, for example, be rented or leased to customers of the provider network 1200 (e.g., to a customer that implements customer network 1250). Each computation resource 1224 may be provided with one or more local IP addresses. Provider network 1200 may be configured to route packets from the local IP addresses of the computation resources 1224 to public Internet destinations, and from public Internet sources to the local IP addresses of computation resources 1224.

Provider network 1200 may provide a customer network 1250, for example coupled to intermediate network 1240 via local network 1256, the ability to implement virtual computing systems 1292 via hardware virtualization service 1220 coupled to intermediate network 1240 and to provider network 1200. In some embodiments, hardware virtualization service 1220 may provide one or more APIs 1202, for example a web services interface, via which a customer network 1250 may access functionality provided by the hardware virtualization service 1220, for example via a console 1294 (e.g., a web-based application, standalone application, mobile application, etc.). In some embodiments, at the provider network 1200, each virtual computing system 1292 at customer network 1250 may correspond to a computation resource 1224 that is leased, rented, or otherwise provided to customer network 1250.

From an instance of a virtual computing system 1292 and/or another customer device 1290 (e.g., via console 1294), the customer may access the functionality of storage virtualization service 1210, for example via one or more APIs 1202, to access data from and store data to storage resources 1218A-1218N of a virtual data store 1216 provided by the provider network 1200. In some embodiments, a virtualized data store gateway (not shown) may be provided at the customer network 1250 that may locally cache at least some data, for example frequently accessed or critical data, and that may communicate with virtualized data store service 1210 via one or more communications channels to upload new or modified data from a local cache so that the primary store of data (virtualized data store 1216) is maintained. In some embodiments, a user, via a virtual computing system 1292 and/or on another customer device 1290, may mount and access virtual data store 1216 volumes, which appear to the user as local virtualized storage 1298.

While not shown in FIG. 12, the virtualization service(s) may also be accessed from resource instances within the provider network 1200 via API(s) 1202. For example, a customer, appliance service provider, or other entity may access a virtualization service from within a respective virtual network on the provider network 1200 via an API 1202 to request allocation of one or more resource instances within the virtual network or within another virtual network.

Figure 13:
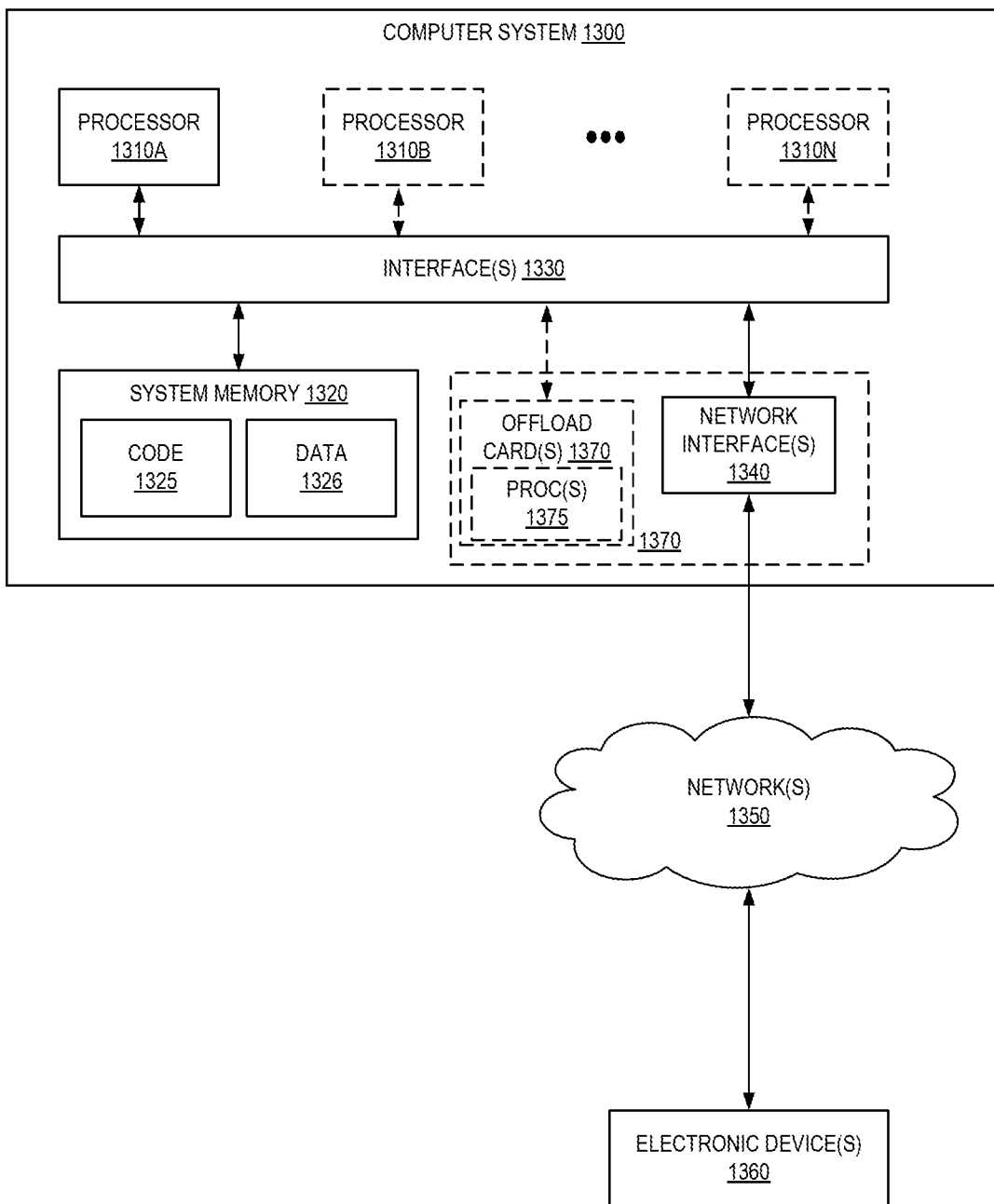
FIG. 13 is a block diagram illustrating an example computer system that may be used in some embodiments.

In some embodiments, a system that implements a portion or all of the techniques for dynamic accuracy-based deployment and monitoring of ML models as described herein may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330. While FIG. 13 shows computer system 1300 as a single computing device, in various embodiments a computer system 1300 may include one computing device or any number of computing devices configured to work together as a single computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1310 may commonly, but not necessarily, implement the same ISA.

System memory 1320 may store instructions and data accessible by processor(s) 1310. In various embodiments, system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1320 as code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIG. 1, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1300 includes one or more offload cards 1370 (including one or more processors 1375, and possibly including the one or more network interfaces 1340) that are connected using an I/O interface 1330 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1300 may act as a host electronic device (e.g., operating as part of a hardware virtualization service) that hosts compute instances, and the one or more offload cards 1370 execute a virtualization manager that can manage compute instances that execute on the host electronic device. As an example, in some embodiments the offload card(s) 1370 can perform compute instance management operations such as pausing and/or un-pausing compute instances, launching and/or terminating compute instances, performing memory transfer/copying operations, etc. These management operations may, in some embodiments, be performed by the offload card(s) 1370 in coordination with a hypervisor (e.g., upon a request from a hypervisor) that is executed by the other processors 1310A-1310N of the computer system 1300. However, in some embodiments the virtualization manager implemented by the offload card(s) 1370 can accommodate requests from other entities (e.g., from compute instances themselves), and may not coordinate with (or service) any separate hypervisor.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of commercially-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 104A-104X, 105A-105Z) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
  executing code on a computing device including a processor to implement a model training system in a provider network;
  executing code on another computing device including a processor to implement a training control system in the provider network;
  executing a machine learning (ML) training job using a first one or more compute instances of the model training system, wherein each of the first one or more compute instances performs a plurality of iterations of a work routine for the ML training job, each iteration including obtaining an identifier of a work unit from a progress manager of the training control system, obtaining a current state associated with the ML training job from a parameter server of the training control system, executing logic to update the current state associated with the ML training job after completing the work unit, sending the updated current state associated with the ML training job to the parameter server of the training control system, and sending a message to the progress manager of the training control system indicating that the work unit is complete;
  determining, by the progress manager of the training control system, that a first compute instance from among the first one or more compute instances of the model training system obtained a first identifier of a first work unit for the ML training job from the progress manager of the training control system at a first time and updated the current state of the first work unit for the ML training job at a second time;
  deriving, by the progress manager of the training control system from the first time and the second time, a speed of the ML training job;
  determining, by the progress manager of the training control system by comparing a predicted training time to a threshold and based at least in part on the deriving of the speed of the ML training job, that a progress of the ML training job is not satisfactory;
  adding, by the model training system based at least in part on the determining that the progress of the ML training job is not satisfactory, a second one or more compute instances of the model training system to the ML training job while the first one or more compute instances of the model training system continue to execute portions of the ML training job, wherein the second one or more compute instances are of a different type than the first one or more compute instances, and wherein the different type is selected based on an execution characteristic of the ML training job that is determined to be problematic hindering performance of the ML training job;
  providing, to the second one or more compute instances of the model training system, an identifier of the parameter server and an identifier of a set of data that the second one or more compute instances of the model training system is to process;
  determining, by the progress manager of the training control system, that the progress of the ML training job is satisfactory; and
  removing, by the model training system based at least in part on the determining that the progress of the ML training job is satisfactory, one or more compute instances of the second one or more compute instances of the model training system or of the first one or more compute instances of the model training system from the ML training job.

2. The computer-implemented method of claim 1, wherein the determining that the progress of the ML training job is satisfactory comprises comparing the predicted training time to the threshold or comparing a learning rate to another threshold.

3. The computer-implemented method of claim 1, the different type of the second one or more compute instances comprising at least one of:
   a different number of virtual processors;
   a different amount of random access memory (RAM);
   a different amount of nonvolatile storage;
   a different amount of networking capacity; or
   a different type or amount of graphical processing units (GPUs) or field programmable gate arrays (FPGAs) available.

4. The computer-implemented method of claim 1, wherein training code is executed within a container.

5. A computer-implemented method comprising:
   executing code on a computing device including a processor to implement a model training system in a provider network;
   executing code on another computing device including a processor to implement a training control system in the provider network;
   executing, using a first one or more compute instances of the model training system, a machine learning (ML) training job by:
      obtaining, from a progress manager of the training control system, a first identifier of a first work unit the first one or more compute instances are to perform for the ML training job;
      obtaining, from a parameter server of the training control system, job state data associated with the ML training job;
      after completing the first work unit, sending a message to the parameter server of the training control system to update the job state data associated with the ML training job; and
      after completing the first work unit, sending a message to the progress manager of the training control system indicating that the first work unit has been completed;
   determining, by the progress manager of the training control system, that the first one or more compute instances of the model training system obtained the first identifier of the first work unit at a first time and the job state data was updated at a second time;
   deriving, by the progress manager of the training control system, from the first time and the second time, a speed of the ML training job;
   determining, by the progress manager of the training control system, by comparing a predicted training time to a threshold and based at least in part on the deriving of the speed of the ML training job, that a progress of the ML training job is not satisfactory;
   adding, by the model training system, based at least in part on the determining that the progress of the ML training job is not satisfactory, a second one or more compute instances of the model training system to the ML training job while the first one or more compute instances of the model training system continue to execute portions of the ML training job, wherein the second one or more compute instances are of a different type than the first one or more compute instances, and wherein the different type is selected based on an execution characteristic of the ML training job that is determined to be problematic hindering performance of the ML training job;
   providing, to the second one or more compute instances of the model training system, an identifier of the parameter server and an identifier of a set of data that the second one or more compute instances of the model training system is to process;
   determining, by the progress manager of the training control system, that the progress of the ML training job is satisfactory; and
   removing, by the model training system, based at least in part on the determining that the progress of the ML training job is satisfactory, one or more compute instances of the second one or more compute instances of the model training system or the first one or more compute instances of the model training system from the ML training job.

6. The computer-implemented method of claim 5, wherein the determining that the progress of the ML training job is satisfactory comprises comparing the predicted training time to the threshold or comparing a learning rate to another threshold.

7. The computer-implemented method of claim 5, wherein the determining that a progress of the ML training job is not satisfactory further comprises comparing a learning rate to another threshold.

8. The computer-implemented method of claim 5, the different type of the second one or more compute instances comprising at least one of:
   a different number of virtual processors;
   a different amount of random access memory (RAM);
   a different amount of nonvolatile storage;
   a different amount of networking capacity; or
   a different type or amount of graphical processing units (GPUs) or field programmable gate arrays (FPGAs) available.

9. The computer-implemented method of claim 5, wherein training code is executed within a container.

10. The computer-implemented method of claim 5, wherein executing the ML training job by the first one or more compute instances further includes obtaining, from a job status manager, an identifier of a parameter server.

11. The computer-implemented method of claim 5, further comprising:
   receiving a request from a client to remove one or more compute instances from the ML training job, wherein the one or more compute instances are of the second one or more compute instances or of the first one or more compute instances; and
   removing the one or more compute instances from the ML training job.

12. The computer-implemented method of claim 5, further comprising:
   receiving a request from a client to add one or more compute instances to the ML training job; and
   adding the one or more compute instances to the ML training job while the first one or more compute instances and the second one or more compute instances continue to execute portions of the ML training job.

13. A system comprising:
   a model training system implemented by a first one or more electronic devices; and a training control system implemented by a second one or more electronic devices, the training control system including second instructions that upon execution cause the training control system to:

cause the model training system to execute a machine learning (ML) training job using a first one or more compute instances of the model training system such that the model training system:
- obtains, from a progress manager of the training control system, a first identifier of a first work unit the first one or more compute instances are to perform for the ML training job;
- obtains, from a parameter server of the training control system, job state data associated with the ML training job;
- after completing the first work unit, sends a message to the parameter server of the training control system to update the job state data associated with the ML training job; and
- after completing the first work unit, sends a message to the progress manager of the training control system indicating that the first work unit has been completed;

determine, by the progress manager of the training control system, that the first one or more compute instances of the model training system obtained the first identifier of the first work unit at a first time and the job state data was updated at a second time;

derive, by the progress manager of the training control system, from the first time and the second time, a speed of the ML training job;

determine, by the progress manager of the training control system, by comparing a predicted training time to a threshold and based at least in part on the deriving of the speed of the ML training job, that a progress of the ML training job is not satisfactory;

cause, by the model training system, based at least in part on the determining that the progress of the ML training job is not satisfactory, a second one or more compute instances of the model training system to be added to the ML training job while the first one or more compute instances of the model training system continue to execute portions of the ML training job, wherein the second one or more compute instances are of a different type than the first one or more compute instances, and wherein the different type is selected based on an execution characteristic of the ML training job that is determined to be problematic hindering performance of the ML training job;

provide, to the second one or more compute instances of the model training system, an identifier of the parameter server and an identifier of a set of data that the second one or more compute instances of the model training system is to process;

determine, by the progress manager of the training control system, that the progress of the ML training job is satisfactory; and cause, by the model training system, based at least in part on the determining that the progress of the ML training job is satisfactory, one or more compute instances of the second one or more compute instances of the model training system or the first one or more compute instances of the model training system to be removed from the ML training job.

14. The system of claim 13, wherein to determine that the progress of the ML training job is satisfactory the instructions upon execution further cause the training control system to compare the predicted training time to the threshold or compare a learning rate to another threshold.

15. The system of claim 13, wherein the determining that a progress of the ML training job is not satisfactory further comprises comparing a learning rate to another threshold.

16. The system of claim 13, the different type of the second one or more compute instances comprising at least one of:
- a different number of virtual processors;
- a different amount of random access memory (RAM);
- a different amount of nonvolatile storage;
- a different amount of networking capacity; or
- a different type or amount of graphical processing units (GPUs) or field programmable gate arrays (FPGAs) available.

17. The system of claim 13, wherein training code is executed within a container.

18. The system of claim 13, wherein the first compute instance is further to obtain, from a job status manager, an identifier of a parameter server.

19. The system of claim 13, wherein the second instructions upon execution further cause the training control system to:
upon a receipt of a request from a client to add one or more compute instances to the ML training job, cause the one or more compute instances to be added to the ML training job while the first one or more compute instances and the second one or more compute instances continue to execute portions of the ML training job.

20. The system of claim 13, wherein the second instructions upon execution further cause the training control system to:
upon a receipt of a request from a client to remove one or more compute instances from the ML training job, wherein the one or more compute instances are of the second one or more compute instances or of the first one or more compute instances, cause the one or more compute instances to be removed to the ML training job.

* * * * *